United States Patent
Omae et al.

(10) Patent No.: US 9,601,271 B2
(45) Date of Patent: *Mar. 21, 2017

(54) DETECTING DEVICE, POWER SUPPLY SYSTEM, AND DETECTING DEVICE CONTROL METHOD

(71) Applicant: Sony Corporation, Tokyo (JP)

(72) Inventors: Uichiro Omae, Kanagawa (JP); Takashi Miyamoto, Kanagawa (JP)

(73) Assignee: Sony Corporation, New York, NY (US)

( * ) Notice: Subject to any disclaimer, the term of this patent is extended or adjusted under 35 U.S.C. 154(b) by 345 days.

This patent is subject to a terminal disclaimer.

(21) Appl. No.: 14/259,345

(22) Filed: Apr. 23, 2014

(65) Prior Publication Data

US 2014/0339907 A1 Nov. 20, 2014

(30) Foreign Application Priority Data

May 16, 2013 (JP) .................................. 2013-103631

(51) Int. Cl.
| | |
|---|---|
| *H01F 27/42* | (2006.01) |
| *H01F 37/00* | (2006.01) |
| *H01F 38/00* | (2006.01) |
| *H01F 38/14* | (2006.01) |
| *G01V 3/10* | (2006.01) |
| *H02J 5/00* | (2016.01) |
| *H02J 7/02* | (2016.01) |

(52) U.S. Cl.
CPC ............. *H01F 38/14* (2013.01); *G01V 3/101* (2013.01); *H02J 5/005* (2013.01); *H02J 7/025* (2013.01)

(58) Field of Classification Search
CPC . H02J 17/00; H02J 5/005; H02J 7/025; H01F 38/14; H01F 27/006; B60L 11/182; B60L 5/005; H04B 5/0037; Y02T 90/122; H02G 7/16
USPC ........................................................ 307/104
See application file for complete search history.

(56) References Cited

U.S. PATENT DOCUMENTS 5,434,372 A * 7/1995 Lin .......................... G06F 3/046
178/18.07
2013/0069441 A1 * 3/2013 Verghese ................ G01R 33/10
307/104

FOREIGN PATENT DOCUMENTS

| JP | 2001-275280 A | 10/2001 |
| JP | 2008-206231 | 9/2008 |

* cited by examiner

*Primary Examiner* — Rexford Barnie
*Assistant Examiner* — Toan Vu
(74) *Attorney, Agent, or Firm* — Michael Best & Friedrich LLP

(57) ABSTRACT

A detecting device includes: a measurement coil made up of a first partial coil to which current in a particular direction is induced by a magnetic field to be supplied to a power reception coil configured to receive power, a second partial coil to which the current in the particular direction is induced by the magnetic field, and a third partial coil, which is disposed between the first and second partial coils, to which current in the opposite direction of the particular direction is induced by the magnetic field; a measurement unit configured to measure the voltage of the measurement coil as measurement coil voltage; and a foreign object detecting unit configured to detect a foreign object within the magnetic field based on the measurement coil voltage.

13 Claims, 17 Drawing Sheets

FIG. 16A 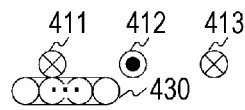 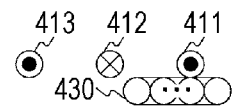
FIG. 16B 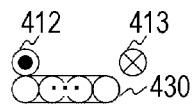 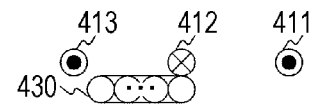
FIG. 16C 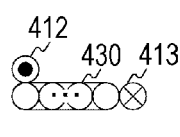 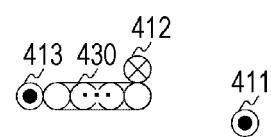
FIG. 16D 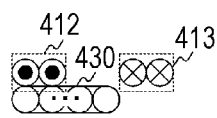 
FIG. 16E 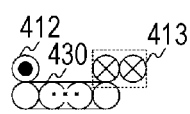 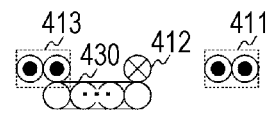
FIG. 16F 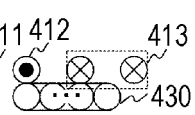 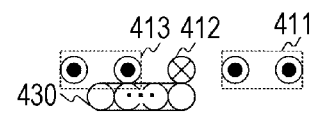
FIG. 16G 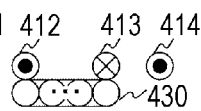 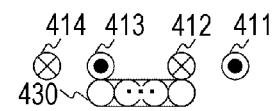
FIG. 16H  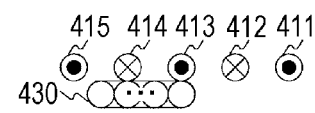
FIG. 16I  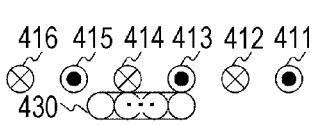

FIG. 17F

DETECTING DEVICE, POWER SUPPLY SYSTEM, AND DETECTING DEVICE CONTROL METHOD

CROSS REFERENCE TO RELATED APPLICATIONS

This application claims the benefit of Japanese Priority Patent Application JP 2013-103631 filed May 16, 2013, the entire contents of which are incorporated herein by reference.

BACKGROUND

The present disclosure relates to a detecting device, a power supply system, and a detecting device control method, and specifically relates to a detecting device, a power supply system, and a detecting device control method, which detect a foreign object within a magnetic field.

Recently, a power supply system, which supplies power to a consumer electronics (CE) device such as a cellular phone, portable music player, or the like in an electrically noncontact manner, has received attention. This power supply system has been referred to as a noncontact power supply system, noncontact power transmission system, or wireless power supply system. This system enables a secondary-side device such as an electronic device or the like to be charged using a simple method such that placing the secondary-side device on a primary-side device such as a power supply device or the like. That is to say, this system eliminates terminal connection between the electronic device and power supply device.

Electromagnetic induction has been widely used as a method to perform supply of power in such a noncontact manner. Lately, a noncontact power supply system, which employs magnetic field resonance (or magnetic resonance) utilizing the resonance phenomenon, has also received attention.

The noncontact power supply system using the magnetic field resonance method has an advantage over the electromagnetic induction method in that transmission of power can be performed between devices with more distance therebetween, utilizing a principle called the resonance phenomenon. Also, the noncontact power supply system using the magnetic field resonance method has an advantage such that power transmission efficiency (that is, power supply efficiency) does not deteriorate even when axial matching is poor between a power supply coil serving as the power supply source and a power reception coil serving as the power supply destination.

However, the fact remains that both the magnetic field resonance method and electromagnetic induction method are noncontact power supply systems utilizing magnetic coupling between a power supply coil serving as the power supply source and a power reception coil serving as the power supply destination.

Incidentally, there have been developed heat generation countermeasures regarding foreign objects such as metal, magnetic materials, magnets, and so forth, which may generate heat due to magnetic field lines, as one of important factors in the noncontact power supply system. Upon a foreign object entering the gap between the power supply coil and power reception coil in the noncontact power supply system in the electromagnetic induction method or magnetic field resonance method, there is a possibility that the foreign object will generate heat due to magnetic field lines passing through this foreign object. Such heat generation of the foreign object is caused due to overcurrent loss generated at a metal foreign object through which the magnetic field lines pass, hysteresis loss generated at a foreign object magnetic material or foreign object magnet or the like through which magnetic field lines pass, or the like.

Since the heat generation of a foreign object may lead to malfunction or damage or the like of the power supply device or electronic device, prevention of heat generation of the foreign object can be said to be a major issue in the noncontact power supply system.

Though there is a technique to deal with this heat generation, which involves adding a temperature sensor to detect the heat generation of a foreign object, this technique is far from being a fundamental solution for the heat generation of a foreign object, since this technique detects the temperature of a foreign object which has already been heated. That is to say, a method for enabling detection of a foreign object before the foreign object excessively generates heat, is desirable as a method for detecting a foreign object which may generate heat due to magnetic field lines.

Therefore, there has been proposed a technique for determining whether or not there is a metal foreign object, by monitoring electrical parameters (current, voltage, and so forth) which will change when a metal foreign object enters between the power supply side and power reception side. Such a technique enables detection of whether or not there is a foreign object, before the foreign object excessively generates heat. Specifically, there has been proposed a technique for detecting a metal foreign object, by monitoring change in amplitude and phase at the time of communication between the power supply side and power reception side (e.g., see Japanese Unexamined Patent Application Publication No. 2008-206231). Also, a method for detecting a metal foreign object according to overcurrent loss has been proposed (e.g., see Japanese Unexamined Patent Application Publication No. 2001-275280).

SUMMARY

However, there is a possibility in the above related art that it is difficult to accurately detect a foreign object. Influence of a metal casing on the power reception side has not been taken into consideration in the above system. It is likely that a common electronic device will include some sort of metal (such as a metal casing, a metal part, or the like). Therefore, it is difficult to distinguish whether change in parameters is due to influence of the metal casing or the like, or due to a metal foreign which has strayed into this space. For example, in the case of detecting a foreign object according to change in overcurrent loss, it is difficult to determine whether the overcurrent loss is caused at the metal casing of the electronic device or is caused by a metal foreign object between the power supply side and power reception side. This is also true in the case of detecting a foreign object according to change in amplitude and phase.

It has been found to be desirable to accurately detect a foreign object within a magnetic field.

According to an embodiment of the present technology, a detecting device includes: a measurement coil made up of a first partial coil to which current in a particular direction is induced by a magnetic field to be supplied to a power reception coil configured to receive power, a second partial coil to which the current in the particular direction is induced by the magnetic field, and a third partial coil, which is disposed between the first and second partial coils, to which current in the opposite direction of the particular direction is induced by the magnetic field; a measurement unit configured to measure the voltage of the measurement coil as measurement coil voltage; and a foreign object detecting unit configured to detect a foreign object within the magnetic field based on the measurement coil voltage, and a control method thereof. Thus, an advantage is provided in which a foreign object is detected based on the measurement coil voltage.

The measurement unit may further measures the voltage and current of the power reception coil, and the foreign object detecting unit may acquire impedance of the power reception coil from the measurement coil voltage and the voltage and current of the power reception coil, and detect the foreign object based on such impedance. Thus, an advantage is provided in which a foreign object is detected based on the impedance.

The measurement unit may further measures the voltage of the power reception coil as power reception coil voltage, and the foreign object detecting unit may acquire a voltage ratio between the measurement coil voltage and the power reception coil voltage, and detect the foreign object based on this voltage ratio. Thus, an advantage is provided in which a foreign object is detected based on the voltage ratio.

The power reception coil may receive first and second power which differ in electric energy in this order, and the foreign object detecting unit may detect the foreign object based on difference between the voltage ratio acquired in the case of the first power having been received, and the voltage ratio acquired in the case of the second power having been received. Thus, an advantage is provided in which a foreign object is detected based on the difference between the voltage ratios.

The first partial coil, the second partial coil, and the third partial coil may be serially connected. Thus, an advantage is provided in which a foreign object is detected based on the voltage of the measurement coil made up of the partial coils which are serially connected.

The area of each coil surface of the first partial coil, the second partial coil, and the third partial coil, may differ. Thus, an advantage is provided in which a foreign object is detected based on the voltage of the measurement coil made up of the partial coils of which the areas of the coil surfaces differ.

Two coils of the first partial coil, the second partial coil, and the third partial coil may be disposed in a position sandwiching the middle of the outermost edge and the innermost edge of the power reception coil. Thus, an advantage is provided in which a foreign object is detected based on the voltage of the measurement coil in which two coils of the partial coils are disposed in a position sandwiching the middle of the outermost edge and the innermost edge of the power reception coil.

At least one of the first partial coil, the second partial coil, and the third partial coil may be disposed outside the outermost edge of the power reception coil. Thus, an advantage is provided in which a foreign object is detected based on the voltage of the measurement coil in which at least one of the partial coils is disposed outside the outermost edge of the power reception coil.

At least one of the first partial coil, the second partial coil, and the third partial coil may be disposed inside the innermost edge of the power reception coil. Thus, an advantage is provided in which a foreign object is detected based on the voltage of the measurement coil in which at least one of the partial coils is disposed inside the innermost edge of the power reception coil.

The first partial coil, the second partial coil, and the third partial coil are disposed generally on the same. Thus, an advantage is provided in which a foreign object is detected based on the voltage of the measurement coil made up of the partial coils disposed generally on the same flat surface.

The first partial coil, the second partial coil, and the third partial coil may be disposed in a position where the centers of the coil surfaces thereof generally agree. Thus, an advantage is provided in which a foreign object is detected based on the voltage of the measurement coil made up of the partial coils disposed in a position where the centers of the coil surfaces thereof generally agree.

The detecting device may further include a power supply device configured to supply the power; and a transmission unit configured to transmit a control signal for requesting reduction of electric energy of the power in the case of the foreign object having been detected to the power supply device. Thus, an advantage is provided in which a control signal for requesting reduction of electric energy of the power is transmitted in the case of the foreign object having been detected.

A detecting device according to an embodiment includes: a measurement coil made up of a first partial coil to which current in a particular direction is induced by a magnetic field that a power supply coil configured to supply power supplies to a power reception coil, a second partial coil to which the current in the particular direction is induced by the magnetic field, and a third partial coil, which is disposed between the first and second partial coils, to which current in the opposite direction of the particular direction is induced by the magnetic field; a measurement unit configured to measure the voltage of the measurement coil as measurement coil voltage; and a foreign object detecting unit configured to detect a foreign object within the magnetic field based on the measurement coil voltage. Thus, an advantage is provided in which a foreign object is detected based on the measurement coil voltage.

A power supply system according to an embodiment includes: a power supply coil configured to supply power via a magnetic field; a power reception coil configured to receive the power; a measurement coil made up of a first partial coil to which current in a particular direction is induced by the magnetic field, a second partial coil to which the current in the particular direction is induced by the magnetic field, and a third partial coil, which is disposed between the first and second partial coils, to which current in the opposite direction of the particular direction is induced by the magnetic field; a measurement unit configured to measure the voltage of the measurement coil as measurement coil voltage; and a foreign object detecting unit configured to detect a foreign object within the magnetic field based on the measurement coil voltage. Thus, an advantage is provided in which a foreign object is detected based on the measurement coil voltage.

According to the present technology, an excellent advantage is yielded wherein a foreign object within a magnetic field can accurately be detected.

BRIEF DESCRIPTION OF THE DRAWINGS

FIGS. 16A to 16I are cross-sectional views illustrating a first example of the layout of a power reception coil and a detection coil, according to a modification; and FIGS. 17A to 17F are cross-sectional views illustrating a second example of the layout of a power reception coil and a detection coil, according to a modification.

DETAILED DESCRIPTION OF EMBODIMENTS

Hereinafter, modes (hereinafter, referred to as embodiments) for implementing the present technology will be described. Description will be made in the following sequence.

Figure 1:
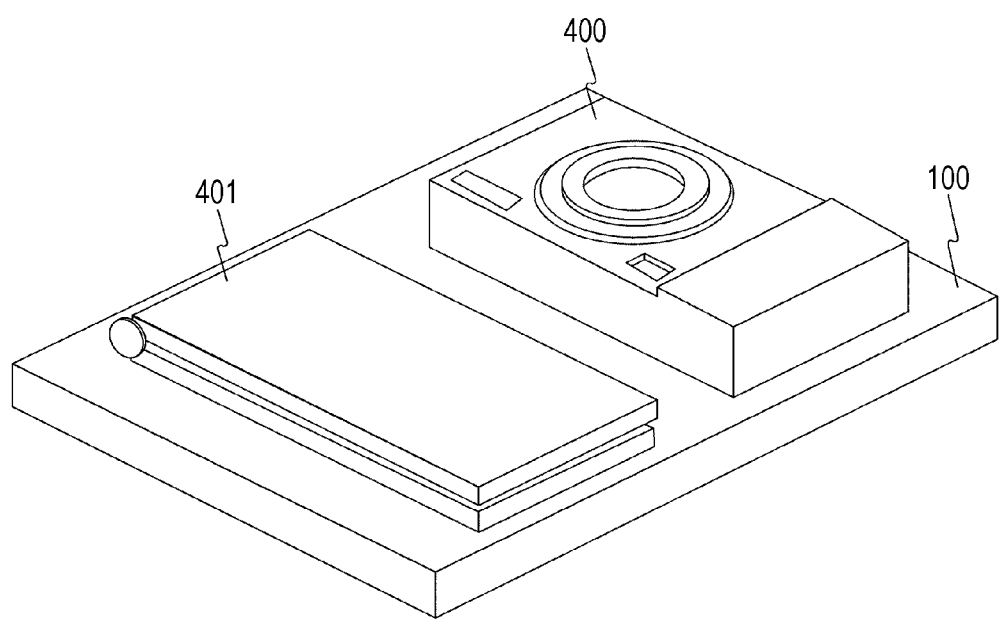
FIG. 1 is a perspective view illustrating a configuration example of a noncontact power supply system according to a first embodiment.

1. First Embodiment (example for detecting a foreign object based on impedance)
2. Second Embodiment (example for detecting a foreign object based on ΔK)
3. Third Embodiment (example for detecting a foreign object based on a voltage ratio)
4. Fourth Embodiment (example for detecting a foreign object based on detection coil voltage)
5. Modifications 1. First Embodiment
Configuration Example of Noncontact Power Supply System FIG. 1 is a perspective view illustrating a configuration example of a noncontact power supply system according to a first embodiment. This noncontact power supply system is a system configured to supply power via a magnetic field in an electrical noncontact manner. The noncontact power supply system includes a power supply device 100 and power reception devices 400 and 401. Note that the number of the power reception devices is not restricted to two, and may be one or three or more.

The power supply device 100 is a device configured to supply power to the power reception devices 400 and 401 using magnetic force in an electrically noncontact manner. A user can perform charging of the power reception devices 400 and 401 using noncontact power supply even without performing terminal connection to an alternating current (AC) adapter or the like by a simple operation such as disposing the power reception devices 400 and 401 on the power supply device 100. Such a charging method reduces the user's burden.

The power supply device 100 is formed in a shape with a flat surface having a certain area, for example. Specifically, the power supply device 100 is formed in a shallow box shape (what we may call a tray shape), a mat-like shape (what we may call a mat shape), or a slightly elevated shape with a flat top (what we may call a trapezoidal shape). A power supply coil configured to generate a magnetic field is disposed on the lower portion or surface of this flat surface (hereinafter, referred to as power supply surface).

It is desirable that the flat surface area of the power supply surface is sufficiently greater than the areas of the power reception surfaces of multiple power reception devices such as the power reception devices 400 and 401 and so forth, so that these multiple power reception devices can be placed thereupon. Here, the power reception surface is a flat surface where a power reception coil configured to receive power supplied via the magnetic field is disposed on the lower portion or surface thereof. The multiple power reception devices are disposed on the power supply surface, whereby the noncontact power supply system can charge these devices sequentially or simultaneously.

Note that, though the area of the power supply surface is configured so as to be greater than the area of the power reception surface, these surfaces are not restricted to this configuration. The areas of those surfaces may be the same level, or the area of the power supply surface may be smaller than the area of the power reception surface. Also, the power reception device 400 and so forth can be charged only by bringing these devices closer thereto, so the shape of the power supply device 100 is not restricted to the shape having a flat surface. For example, the power supply device 100 may have a stand type shape such as a desk holder or cradle.

Also, though the power supply device 100 is configured to perform charging alone, the power supply device 100 may perform bi-directional data transfer with the power reception device 400 while charging.

The power reception device 400 is configured to receive the power supplied from the power supply device 100 via the magnetic field. For example, an electronic device such as a cellular phone terminal or electronic still camera or the like is employed as the power reception device 400. This power reception device 400 detects whether or not there is a foreign object within the magnetic field, and when there is a foreign object, requests the power supply device 100 to reduce power supply amount. In response to this request, the power supply device 100 reduces the power supply amount. Thus, heat generation of the foreign object is suppressed. The configuration of the power reception device 401 is the same as that of the power reception device 400.

Note that the power reception device 400 may be a device other than electronic devices such as electric cars and so forth. In the case that the power reception device 400 is an electric car, the power reception device 400 can detect a metal foreign object mixed in mud or the like adhering to the car body, for example.

Configuration Example of Power Supply Device

Figure 2:
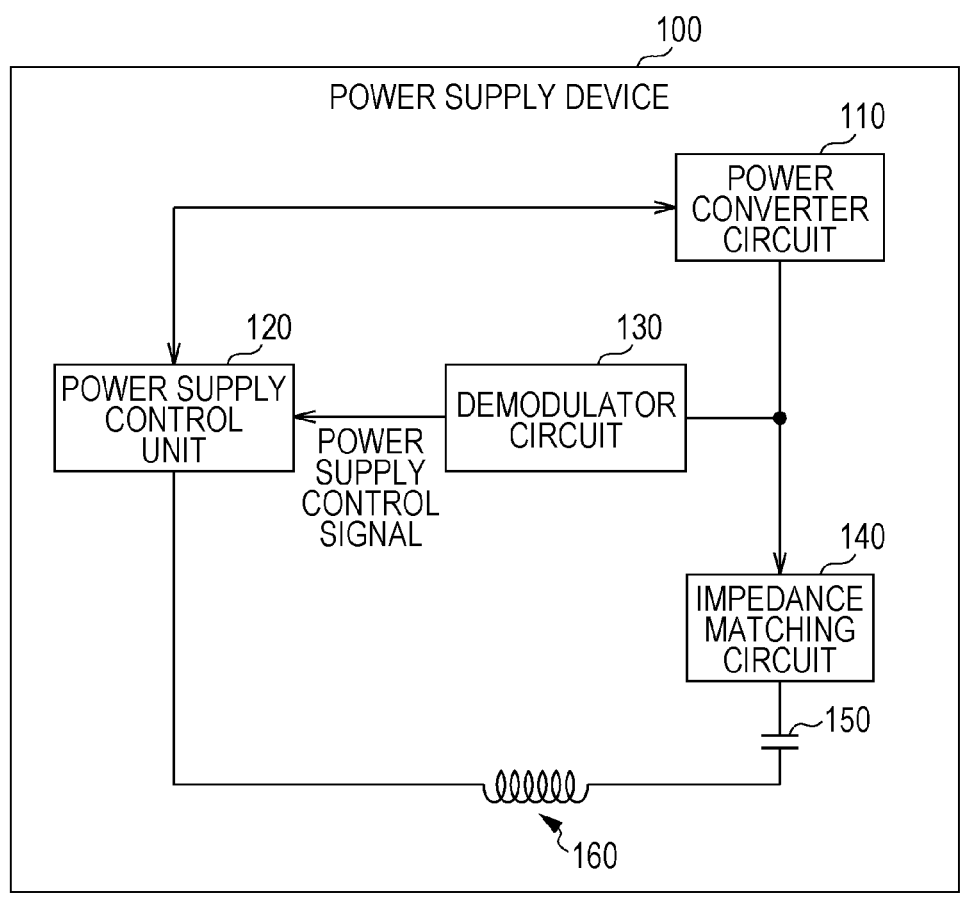
FIG. 2 is a block diagram illustrating a configuration example of a power supply device according to the first embodiment.

FIG. 2 is a block diagram illustrating a configuration example of the power supply device 100 according to the first embodiment. This power supply device 100 includes a power converter circuit 110, a power supply control unit 120, a demodulator circuit 130, an impedance matching circuit 140, a capacitor 150, and a power supply coil 160.

The power converter circuit 110 is a circuit configured to convert the voltage or frequency of the power supplied from an external power supply source of the power supply device 100 to generate AC power for performing power transmission. Also, upon change of the frequency being instructed by the power supply control unit 120, the power converter circuit 110 changes the frequency of the AC power to be generated. Here, examples of the external power supply source include a commercial power source to be supplied via a plug socket (what we may call an outlet).

The power supply control unit 120 is configured to control electric energy to be supplied to the power reception device 400. Upon the power of the power supply device 100 being turned on, the power supply control unit 120 controls the power converter circuit 110 to start supply of predetermined electric energy W1 to the power reception device 400. Here, the electric energy W1 is set to the minimum electric energy sufficient for operating the power reception device 400.

Next, the power supply control unit 120 receives a power supply control signal for controlling the power supply amount from the power reception device 400 via the demodulator circuit 130. The power supply control unit 120 controls the power supply amount in accordance with the power supply control signal thereof. This power supply control signal includes a signal for requesting increase in the power supply amount and a signal for requesting decrease in the power supply amount, for example.

Upon increase in the power supply amount having been requested, the power supply control unit 120 controls the power converter circuit 110 to supply higher electric energy W2 than the electric energy W1 to the power reception device 400. Here, the electric energy W2 is set to electric energy sufficient for the power reception device 400 performing charging of a secondary battery or the like, for example.

Upon decrease in the power supply amount having been requested when the electric energy is W2, the power supply control unit 120 controls the power converter circuit 110 to return the electric energy to W1. Note that, though the power supply control unit 120 controls the electric energy in the two stages of W1 and W2, the power supply control unit 120 may control the electric energy in three or more stages, or may control start and stop of power supply.

Control of the power supply amount is realized by the power supply control unit 120 controlling the power converter circuit 110 to change the AC frequency, for example. Specifically, in the case of increasing the power supply amount, the power supply control unit 120 brings the AC frequency generally into line with a particular frequency (e.g., resonance frequency), and in the case of decreasing the power supply amount, performs control so as to change the AC frequency into a value different from the particular frequency.

Note that the control of the power supply amount is not restricted to change of the AC frequency. For example, the power supply control unit 120 may control the power supply amount by controlling the power converter circuit 110 to depressurize or pressurize the AC voltage. Also, in the case of a configuration wherein the power converter circuit 110 generates a pulse signal using a switching power source or the like to supply this to the power supply coil 160, the power supply control unit 120 may control the power supply amount by changing the duty ratio of the pulse signal thereof.

The demodulator circuit 130 is configured to demodulate the AC signal from the power reception device 400 and to extract the power supply control signal superimposed on the AC signal thereof. The demodulator circuit 130 supplies the power supply control signal thereof to the power supply control unit 120.

The impedance matching circuit 140 is a circuit configured to control the impedance of the power supply side circuit to match this with the impedance of the power reception side circuit. The transmission efficiency of power is improved by performing impedance matching. Note that, in the case that the transmission efficiency is sufficiently high, or in the case that the transmission efficiency is sufficiently improved by impedance matching on the power reception side alone, or the like, the impedance matching circuit 140 may be omitted from the configuration.

The capacitor 150 is a device configured to store or release electric energy. This capacitor 150 is serially connected to the power supply coil 160 and makes up an LC resonance circuit along with the power supply coil 160, for example. The capacitance value of the capacitor 150 is set so that the resonance frequency f1 of this LC resonance circuit generally agrees with the resonance frequency f2 of the LC resonance circuit on the power reception side, or becomes a frequency in the vicinity of the resonance frequency f2.

Note that, in the case that the resonance frequency f1 is obtained by parasitic capacitance components configured including wiring capacitance within the power supply coil 160, capacitance between the power supply coil 160 and a later-described power reception coil, and so forth, the capacitor 150 may be omitted from the configuration. Also, in the case that the transmission efficiency of power is sufficiently high, or the like, the capacitor 150 may be omitted from the configuration.

Also, the capacitor 150 may be a variable capacitance capacitor. In this case, the power supply control unit 120 controls the capacitance thereof to adjust the resonance frequency.

Upon the AC power having been supplied from the power converter circuit 110, the power supply coil 160 generates electromagnetic waves in accordance with Ampere's rule. Power is supplied to the power reception device 400 via the electromagnetic waves.

Note that, though the power supply device 100 is configured to include the single power supply coil 160, the power supply device 100 may be configured to include multiple power supply coils 160.

Configuration Example of Power Reception Device

Figure 3:
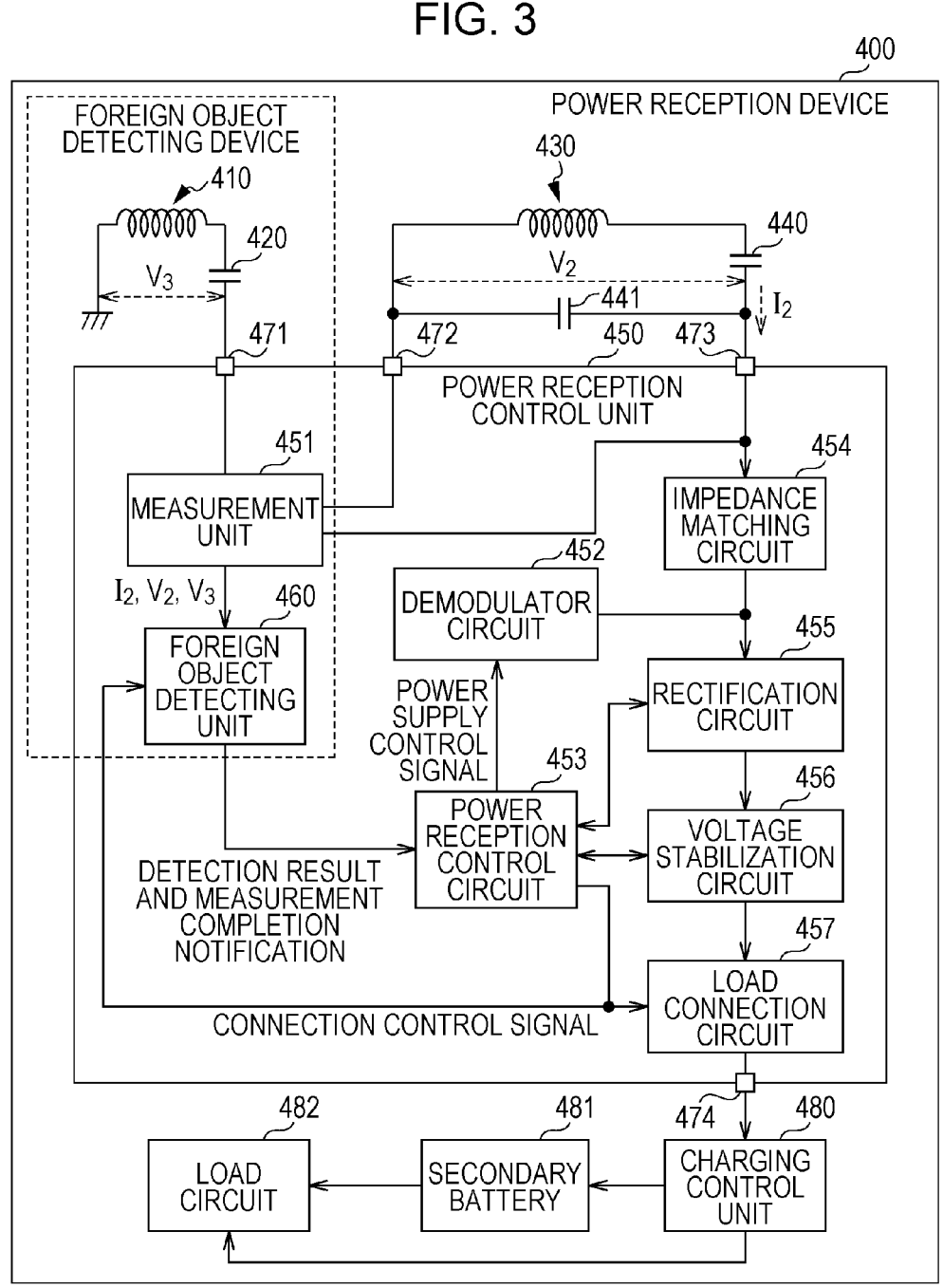
FIG. 3 is a block diagram illustrating a configuration example of a power reception device according to the first embodiment.

FIG. 3 is a block diagram illustrating a configuration example of the power reception device 400 according to the first embodiment. The power reception device 400 includes a detection coil 410, a capacitor 420, a power reception coil 430, capacitors 440 and 441, and a power reception control unit 450. Also, the power reception device 400 includes a charging control unit 480, a secondary battery 481, and a load circuit 482.

The detection coil 410 is a coil which is disposed in the vicinity of the power reception coil 430, of which the voltage is measured to detect a foreign object. Note that the detection coil 410 is an example of a measurement coil as mentioned in the Summary.

The capacitor 420 is a device configured to store or release electric energy. This capacitor 420 is, for example, serially connected to the detection coil 410. The capacitor 420 is used for a resonance application, a filter application, a coupling application, or the like. In particular, in the case of the resonance application, the capacitor 420 makes up an LC resonance circuit along with the detection coil 410. The capacitance value of the capacitor 420 is set so that the resonance frequency of the LC resonance circuit becomes a frequency f3. Also, in the case of reducing electromagnetic interference result from the power supply side, it is desirable to set the resonance frequency f3 so as to be different from the resonance frequency f1 on the power supply side. Conversely, in the case of positively utilizing the electromagnetic interference result from the power supply side, the frequency f3 may be set so as to generally agree with the resonance frequency f1 on the power supply side. It goes without saying that, in the case of a situation in which the capacitor 420 is not used for the resonance application, filter application, coupling application, or the like, the capacitor 420 does not necessarily have to be provided.

The power reception coil 430 is configured to receive the power supplied from the power supply device 100. Specifically, upon an electromagnetic wave having been supplied from the power supply device 100, the power reception coil 430 generates induced voltage according to change in the electromagnetic flux of the electromagnetic wave thereof in accordance with an electromagnetic induction rule.

Note that, though the power reception device 400 is configured to include the single power reception coil 430, the power reception device 400 may be configured to include multiple power reception coils 430. Also, in the case that the power reception device 400 includes multiple power reception coils 430, the detection coil 410 is disposed in the vicinity of at least one of the power reception coils 430.

The capacitors 440 and 441 are devices configured to store or release electric energy. The capacitor 440 is serially connected to the power reception coil 430, and the capacitor 441 is connected to the power reception coil 430 in parallel. These capacitors 440 and 441 make up an LC resonance circuit along with the power reception coil 430. The capacitance values of the capacitor 440 and so forth are set so that the resonance frequency f2 of this LC resonance circuit generally agrees with the resonance frequency f1 of on the power reception side, or becomes a frequency in the vicinity of the resonance frequency f1.

Note that at least one of the capacitors 420 and 440 may be a variable capacitance capacitor. In this case, the power reception control unit 450 controls the capacitance thereof to adjust the resonance frequency. On the other hand, in the case that the resonance frequency f2 is obtained by parasitic capacitance components configured including wiring capacitance within the power reception coil 430, capacitance between the power supply coil 160 and power reception coil 430, and so forth, the capacitors 420 and 440 may be omitted from the configuration. Also, in the case that the transmission efficiency of power is sufficiently high, or the like, the capacitors 420 and 440 may be omitted from the configuration.

Also, the power reception device 400 may further include a resonance circuit other than the resonance circuit including the detection coil 410 and the resonance circuit including the power reception coil 430.

The power reception control unit 450 is configured to control the entire power reception device 400. This power reception control unit 450 includes a measurement unit 451, a foreign object detecting unit 460, a modulator circuit 452, a power reception control circuit 453, an impedance matching circuit 454, a rectification circuit 455, a voltage stabilization circuit 456, and a load connection circuit 457.

Also, the power reception control unit 450 includes terminals 471, 472, 473, and 474. One end of the detection coil 410 is connected to the terminal 471 via the capacitor 420. The LC resonance circuit including the power reception coil 430 is connected to the terminals 472 and 473. The charging control unit 480 is connected to the terminal 474.

The measurement unit 451 is configured to measure the voltage $V_2$ and current $I_2$ of the power reception coil 430, and the voltage $V_3$ of the detection coil 410. The voltage is measured by an instrument transformer or the like. The current is obtained from electrical potential difference of both thereof after serially connecting a shunt resistor to the power reception coil, for example. Volt (V) is employed as the unit of voltage and ampere (A) is employed as the unit of current in the measurement.

Note that the current may be obtained by a current transformer. Also, the measurement unit 451 includes an amplifier circuit configured to amplify the AC signal, and may measure voltage and so forth amplified by the amplifier circuit thereof. According to amplification of the AC signal, the measurement unit 451 can measure voltage and so forth with high precision.

Hereinafter, the voltage $V_2$ of the power reception coil 430 will be referred to as "power reception coil voltage", and the current $I_2$ of the power reception coil 430 will be referred to as "power reception coil current". Also, hereinafter, the voltage $V_3$ of the detection coil will be referred to as "detection coil voltage". The measurement unit 451 supplies these measured values to the foreign object detecting unit 460.

Here, let us say that the power reception coil voltage and power reception coil current that will be measured are voltage and current before rectification by the rectification circuit 455. Note that the measurement unit 451 may be configured to measure the power reception coil voltage and power reception coil current after rectification.

The foreign object detecting unit 460 is configured to detect a foreign object within the magnetic field from the power supply device 100 based on the measured values measured by the measurement unit 451. The foreign object detecting unit 460 determines whether or not load is connected, based on the connection control signal from the power reception control unit 450. Next, the foreign object detecting unit 460 acquires the measured values each time of when load is connected and when load is not connected, and detects a foreign object based on the measured values thereof. The details of the detecting method will be described later. The foreign object detecting unit 460 then supplies the foreign object detection result to the power reception control unit 450.

Note that the device including the detection coil 410, measurement unit 451, and foreign object detecting unit 460 is an example of the detecting device mentioned in the Summary. Also, though the detecting device is configured so as to be housed in the power reception device 400, the detecting device may be configured so as to be provided outside the power reception device 400.

The modulator circuit 452 is configured to superimpose a power supply control signal by modulating the amplitude or the like of the AC signal for the power supply device 100.

Upon having received the power supply control signal from the power reception control circuit 453, this modulator circuit 452 superimposes the power supply control signal thereof on the AC signal. Thus, the power supply control signal is transmitted to the power supply device 100.

Note that, though the modulator circuit 452 performs load modulation, modulation may be performed by another modulation method other than load modulation. Also, though the power reception device 400 transmits the power supply control signal by load modulation, the power supply control signal may be transmitted by another method. For example, an arrangement may be made wherein the power reception device 400 includes a communication coil and an antenna, and transmits the power supply control signal using these.

The power reception control circuit 453 is configured to control the power supply amount based on the foreign object detection result. Upon the power with the electric energy W1 having been supplied from the power supply device 100, the power supply control circuit 453 supplies a connection control signal for instructing disconnection of load to the load connection circuit 457.

Upon having received the measurement completion notification from the foreign object detecting unit 460, the power reception control circuit 453 supplies a connection control signal for instructing connection of load to the load connection circuit 457, and supplies a power supply control signal for requesting increase in the power supply amount to the modulator circuit 452. Thus, the power supply amount is increased from W1 to W2.

After the power supply amount W2 is supplied, upon having received a detection result indicating that a foreign object has been detected, the power reception control circuit 453 supplies a connection control signal for instructing disconnection of load to the load connection circuit 457, and supplies a power supply control signal for requesting reduction in the power supply amount to the modulator circuit 452. Thus, the power supply amount is decreased from W2 to W1, and heat generation of the foreign object is suppressed.

Note that, though the power reception control circuit 453 requests to return the power supply amount to the initial W1 when detecting a foreign object, the power reception control circuit 453 may be configured so as to request to decrease the power supply amount further lower than W1. Also, the power reception control circuit 453 may request the power supply amount lower than W2 but higher than W1 when detecting a foreign object. Alternatively, the power reception control circuit 453 may be configured so as to request stopping of power supply when detecting a foreign object, or may be configured so as to instruct only disconnection of load when detecting a foreign object and not requesting reduction of the power supply amount. In the case of not requesting reduction of the power supply amount, the modulator circuit 452 does not have to be provided. Also, though the power reception control circuit 453 disconnects load when detecting a foreign object, the power reception control circuit 453 may be configured so as to request reduction of the power supply amount while keeping connection of load when detecting a foreign object.

Also, though the power reception control circuit 453 transmits the power supply control signal alone, the power reception control circuit 453 may further transmit the foreign object detection result separately from the power supply control signal. In this case, the power supply device 100 should reduce the power supply amount when detecting a foreign object.

Also, the power reception control circuit 453 controls the rectification circuit 455 and voltage stabilization circuit 456. For example, upon the electric energy W2 having been supplied, the power reception control circuit 453 activates the rectification circuit 455 and voltage stabilization circuit 456, and when detecting a foreign object, stops these.

The impedance matching circuit 454 is a circuit configured to control the impedance of the power reception side circuit so as to match the impedance of the power supply side circuit. The transmission efficiency of power is improved by performing impedance matching. Note that, in the case that the transmission efficiency is sufficiently high, or in the case that the transmission efficiency is sufficiently improved by impedance matching on the power supply side alone, or the like, the impedance matching circuit 454 may be omitted from the configuration.

The rectification circuit 455 is configured to rectify the AC power supplied from the power supply device 100 to generate DC power. This rectification circuit 455 supplies the generated DC power to the charging control unit 480 via the voltage stabilization circuit 456 and load connection circuit 457. The voltage stabilization circuit 456 is configured to control the voltage of the DC power in a stabilized manner.

Note that, though by the rectification circuit 455 is configured to supply the power after the own rectification to the voltage stabilization circuit 456 without change, the present technology is not restricted to this configuration. For example, a smoothing circuit configured to smooth the power after rectification may be provided between the rectification circuit 455 and voltage stabilization circuit 456.

The load connection circuit 457 is configured to control to make the transition to either of a state in which load is connected, and a state in which load is not connected in accordance with the control of the power reception control circuit 453. Specifically, upon disconnection of load having been instructed, the load connection circuit 457 changes an electric path between the rectification circuit 455 and charging control unit 480 to an opened state to shut off supply of the DC power. On the other hand, upon connection of load having been instructed, the load connection circuit 457 changes the electric path between the rectification circuit 455 and charging control unit 480 to a closed state.

The charging control unit 480 is configured to control the voltage or current of the DC power to charge the secondary battery 481. Also, during charging of the secondary battery 481 the charging control unit 480 supplies part of the charging power thereof to the load circuit 482. The secondary battery 481 is configured to store power charged by the charging control unit 480. For example, a lithium-ion battery or the like is employed as the secondary battery 481. The load circuit 482 is a circuit configured to operate using the power from the secondary battery 481 or charging control unit 480.

Note that, though the charging control unit 480 is provided outside the power reception control unit 450, the charging control unit 480 may be housed in the power reception control unit 450. Thus, the power reception control unit 450 can effectively restrict or stop supply of power for the secondary battery 481 or load circuit 482. In this case, the charging control unit 480 may be housed in the power reception control circuit 453. On the other hand, while providing the charging control unit 480 outside the power reception control unit 450, the charging control unit 480 may control at least part of the power reception control unit 450.

Also, though the detecting device is provided to the power reception side, this detecting device may be provided to the power supply side instead of the power reception side. In this case, the detection coil 410 is disposed in the vicinity of the power supply coil 160, and the foreign object detecting unit 460 detects a foreign object within the magnetic field which the power supply coil 160 thereof generates. Also, the detecting device is provided inside or outside the power supply device 100. Alternatively, the detecting device may be provided to both of the power supply side and power reception side.

Also, the power supply device 100 and power reception device 400 may further include a circuit and so forth as appropriate other than the configurations exemplified in FIGS. 2 and 3. For example, at least one of the power supply device 100 and power reception device 400 may further include a display unit configured to display the foreign object detection result and so forth, a communication unit configured to perform bi-directional communication, and a detecting unit configured to detect whether or not the power reception device 400 is disposed in the power supply device 100, and so forth.

Figure 4A:
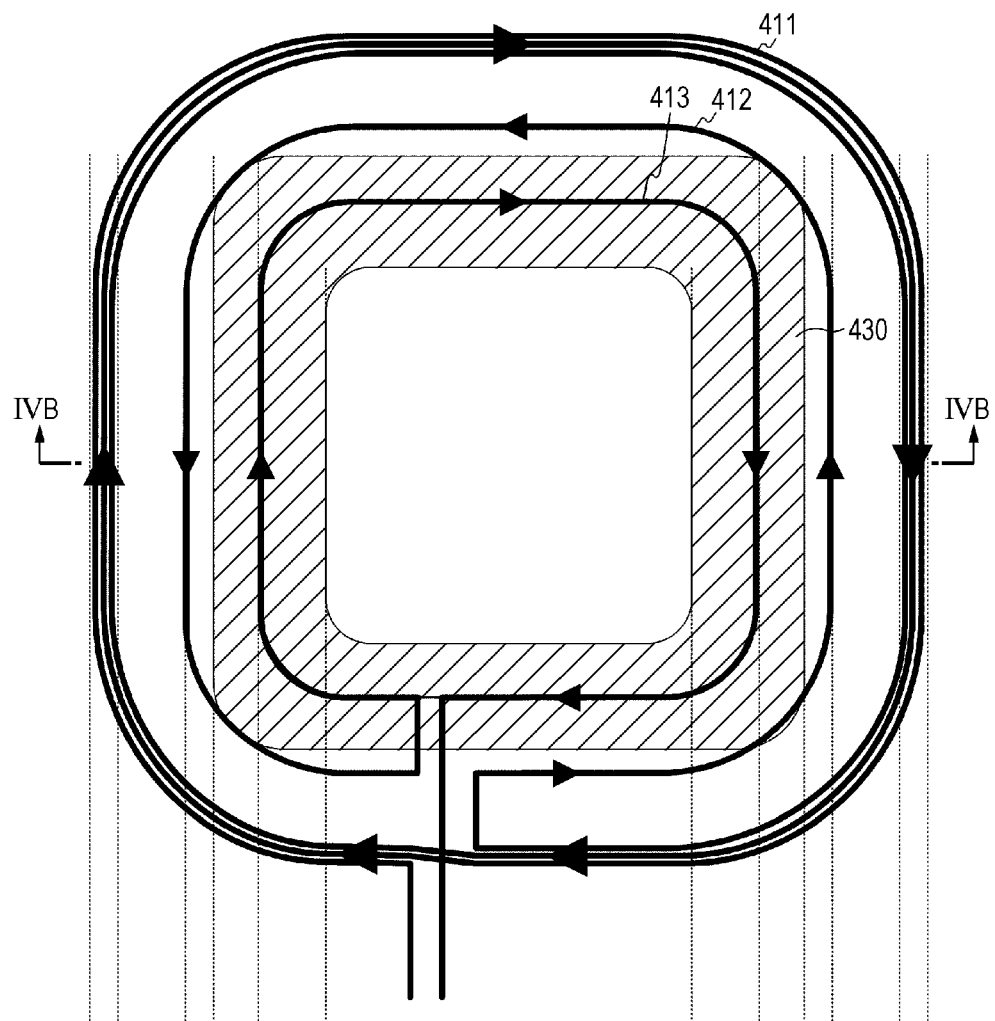
FIGS. 4A and 4B are diagrams illustrating an example of a power reception coil and a detection coil, according to the first embodiment.
Figure 4B:
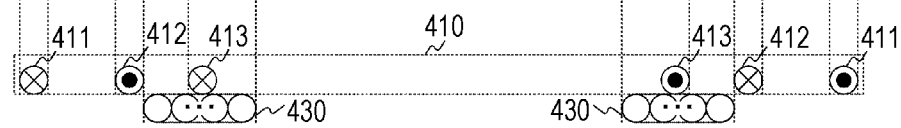

FIGS. 4A and 4B are diagrams illustrating an example of the power reception coil 430 and detection coil 410 according to the first embodiment. FIG. 4A is an example of a plan view of the power reception coil 430 and detection coil 410.

The detection coil 410 includes three of partial coils 411, 412, and 413. These coils are disposed in the vicinity of the power reception coil 430. For example, the detection coil 410 is disposed within the magnetic field where the power is supplied to the power reception coil 430.

The partial coils 411, 412, and 413 of the detection coil 410 are concentrically disposed so as to generate a certain gap between the adjacent partial coils. The partial coil 411 is disposed on the outermost side, the partial coil 413 is disposed on the innermost side, and the partial coil 412 is disposed in the middle of these. In other words, the area of the coil surface of the partial coil 411 is the largest, the area of the coil surface of the partial coil 413 is the smallest, and the area of the coil surface of the partial coil 412 is the intermediate size of these.

The gap between the adjacent partial coils is an air gap, for example. Note that the gap may not be an air gap by providing or filling a material such as resin, glass, or magnetic material, or the like, which does not greatly disturb magnetic field lines in the gap. Also, at least some winding wires of the power reception coil 430 may be disposed between the adjacent partial coils.

Also, the partial coil 412 is a coil of which the direction of the induced current to be induced to the partial coil 411 by the magnetic field from the power supply device 400 is the opposite direction of the direction of induced current to be induced to the partial coils 411 and 413 by the magnetic field thereof. For example, the induced current flows to the partial coils 411 and 413 in the clockwise direction as to the vertical axis perpendicular to the coil surface of the power reception coil 430 by the magnetic field. On the other hand, the induced current flows to the partial coil 412 in the counterclockwise direction as to the vertical axis thereof by the magnetic field.

The partial coils 411, 412, and 413 thus disposed are serially electrically connected, for example. Note that, though there are many cases where serial connection is desired from the view of implementation and mass production, these partial coils may be connected in parallel.

It is desirable to dispose these partial coils 411, 412, and 413 so that the centers thereof generally agree. Also, it is desirable to dispose these partial coils so that the centers thereof generally agree with the center of the power reception coil 430.

Also, it is desirable that the outermost portion of the partial coil 411 having the greatest radius is positioned outside the track center portion (the middle of the outermost edge and the innermost edge of the power reception coil) of the power reception coil 430. Also, it is desirable that the innermost portion of the partial coil 413 having the smallest radius is positioned inside the track center portion of the power reception coil 430.

Also, it is desirable that the innermost portion of the partial coil 411 having the greatest radius is positioned outside the outermost portion of the power reception coil 430. Also, it is further desirable that the outermost portion of the partial coil 413 having the smallest radius is positioned inside the outermost portion of the power reception coil 430. Note that, in this case, the detection coil 410 and power reception coil 430 can be configured generally on the same flat surface.

Also, though the detection coil 410 includes the three partial coils, the detection coil 410 may include four or more partial coils. In this case as well, as exemplified in FIG. 4A, the adjacent partial coils are each wound mutually in the opposite direction. Also, these partial coils are connected in serial or in parallel.

FIG. 4B is an example of the cross-sectional view of the power reception coil 430 and detection coil 410 along line IVB-IVB line in FIG. 4A. As exemplified in FIG. 4B, in order to reduce the thickness of the entire detection coil 410, and from the view of implementation and mass production, it is desirable that the partial coils 411, 412, and 413 are disposed generally on the same flat surface.

Note that, though the detection coil 410 is disposed on the flat surface different from the power reception coil 430 in FIG. 4B, these may be disposed on the same flat surface.

The power reception coil 430, detection coil 410, and power supply coil 160 are formed, for example, by winding an electrically conductive winding wire, and the number of windings is optional. Note that these coils may be formed by another method other than the method for wining an electrically conductive winding wire. For example, these coils may be formed on a printed-wiring board or flexible printed board using electrically conductive patterns. Such a coil is referred to as a pattern coil or pattern loop. The pattern coil can also be formed by processing a board on which an electrically conductive material is printed or vapor-deposited, an electrically conductive sheet metal or sheet, or the like.

Also, these coils may be configured using a method for winding a winding wire obtained by bundling multiple electrically conductive wires. Specifically, the coils are configured using a method for winding a winding wire obtained by bundling two electrically conductive wires, or a method for winding a winding wire obtained by bundling three wires, or the like. The former is referred to as bifilar winding, and the latter is referred to as trifilar winding. Also, the winding wires of the coils may be a winding wire obtained by bundling and twisting multiple electrically conductive wires (e.g., litz wire).

Also, a spiral-shaped or helical-shaped coil of which the winding wire is wound in the thickness direction may be employed as these coils. Also, the coils may be formed in an alpha winding shape where a spiral-shaped coil is disposed so as to be folded back with two layers, a further multi-layered spiral shape, or the like.

Also, in order to prevent magnetic flux leakage and improve transmission efficiency, a shield made of a magnetic material, magnet, electrical conductor, metal, or the like may be provided to the circumference of these coils.

Also, the detection coil 410 may be provided inside a portion (track) where the winding wire of the power reception coil 430 is wound. Further, a coil used for an application other than noncontact power supply, such as an induction heating coil, a wireless communication coil, or the like may be employed together as the detection coil 410. Moreover, the power reception coil 430 may be employed together as the detection coil 410 depending on the configuration of the noncontact power supply system. Note that anticipated examples of such parallel use include a case where switching is employed together as a part of the coils in addition to a case where the exact same coils are employed together.

Figure 5:
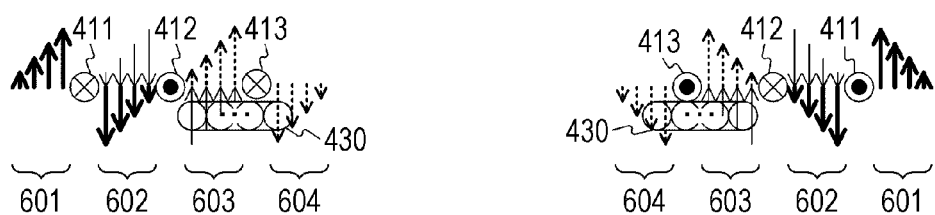
FIG. 5 is a diagram illustrating an example of a distribution of a magnetic field that the detection coil according to the first embodiment generates.

FIG. 5 is a diagram illustrating an example of a distribution of the magnetic field which the detection coil 410 according to the first embodiment generates. Current with a mutually different direction is induced to the partial coil 411 on the outermost side and the partial coil 412 on the inner side thereof by the magnetic field. Therefore, magnetic field lines generated by the induced current of the partial coil 411 and magnetic field lines generated by the induced current of the partial coil 412 are not cancelled out in a region 602 between these coils. Similarly, cancellation of magnetic field lines is not caused in a region 603 between the partial coils 412 and 413. Thus, magnetic field lines are evenly distributed on each of the regions 601, 602, and 603 outside the partial coil 411, and the region 604 inside the partial coil 413.

When there is an electrically conductive foreign object such as metal or the like within such a magnetic field, overcurrent is generated at the foreign object by electromagnetic induction effect. The foreign object is heated by joule heat due to this overcurrent. Also, the magnetic field where the overcurrent thereof is generated affects the detection coil 410 and power reception coil 430 to change electrical properties such as impedance at equivalent circuits thereof, and so forth. Accordingly, the power supply device 400 can detect a foreign object based on the voltages of the coils thereof and so forth.

On the other hand, if the same winding method is employed as the winding methods of the adjacent partial coils (411 and 412, etc.), induced current flows in the same direction at these coils. Therefore, the magnetic fields which these partial coils generate cancel out each other between the partial coils, which complicates detection of a foreign object.

Configuration Example of Foreign Object Detecting Unit

Figure 6:
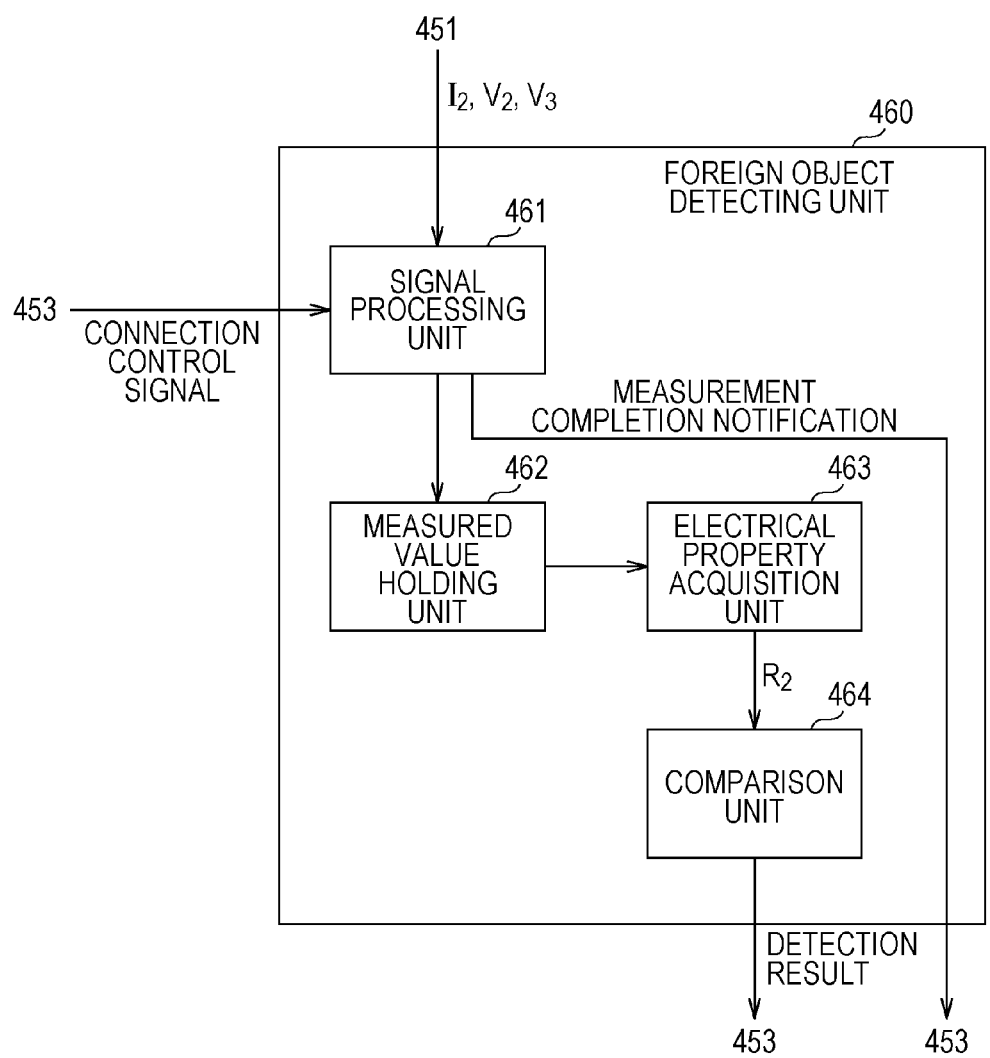
FIG. 6 is a block diagram illustrating a configuration example of a foreign object detecting unit according to the first embodiment.

FIG. 6 is a block diagram illustrating a configuration example of the foreign object detecting unit 460 according to the first embodiment. This foreign object detecting unit 460 includes a signal processing unit 461, a measured value holding unit 462, an electrical property acquisition unit 463, and a comparison unit 464.

The signal processing unit 461 is configured to subject measured values to predetermined signal processing. Specifically, separation of the real and imaginary components of an AC signal is performed as the signal processing. The signal processing unit 461 causes the measured value holding unit 462 to hold power reception coil current $I_{2off}$ measured when load is not connected. Also, the signal processing unit 461 causes the measured value holding unit 462 to hold the real component of each of power reception coil voltage $V_{2off}$ and detection coil voltage $V_{3off}$ measured when load is not connected. After holding the measured values when load is not connected, the signal processing unit 461 generates a measurement completion notification, and supplies this to the power reception control circuit 453.

Upon load having been connected, the signal processing unit 461 causes the measured value holding unit 462 to hold power reception coil current $I_{2on}$ measured at that time. Also, the signal processing unit 461 causes the measured value holding unit 462 to hold the real component of each of power reception coil voltage $V_{2on}$ and detection coil voltage $V_{3on}$ measured when load is connected. The measured value holding unit 462 is configured to hold the measured values.

Note that the signal processing unit 461 may further execute processing for separating a fundamental component, harmonic component, and noise component, and extracting the fundamental component alone as the signal processing. Also, the signal processing unit 461 may further execute processing for acquiring information regarding a carrier frequency, and information regarding the duty ratio of the carrier frequency, and informing these to the power reception control circuit 453. Also, in the case that the measurement unit 451 is configured to measure the DC voltage and so forth, the signal processing unit 461 does not have to execute separation of the real and imaginary components.

The electrical property acquisition unit 463 is configured to acquire parameters indicating the electrical properties of at least one of the power reception coil 430 and detection coil 410 from the measured values. This electrical property acquisition unit 463 acquires the impedance of the power reception coil 430 on the equivalent circuit as a parameter, for example. Specifically, the electrical property acquisition unit 463 reads out the power reception coil currents $I_{2on}$ and $I_{2off}$, power reception coil voltages $V_{2on}$ and $V_{2off}$, and detection coil voltages $V_{3on}$ and $V_{3off}$ from the measured value holding unit 462. Next, the electrical property acquisition unit 463 obtains resistance $R_2$ from the measured values thereof as the impedance of the power reception coil 430 using the following Expressions 1 to 4. The electrical property acquisition unit 463 supplies the obtained resistance $R_2$ to the comparison unit 464.

$$R_2 \approx \frac{\Delta K}{I_{2on}/\text{real}(V_{3on}) - I_{2off}/\text{real}(V_{3off})} \quad \text{Expression 1}$$

$$\Delta K = K_{off} - K_{on} \quad \text{Expression 2}$$

$$K_{off} = \frac{\text{real}(V_{2off})}{\text{real}(V_{3off})} \quad \text{Expression 3}$$

$$K_{on} = \frac{\text{real}(V_{2on})}{\text{real}(V_{3on})} \quad \text{Expression 4}$$

Here, Expression 1 is derived from $(R_2+R_{on})\times I_2 \approx \text{real}(V_{2on})$ and $(R_2+R_{off})\times I_{2off} \approx \text{real}(V_{2off})$. In these expressions, $R_{on}$ denotes the real part of the impedance of a circuit substantially connected to the power reception coil 430 when load is connected, and $R_{off}$ denotes the real part of the impedance of a circuit substantially connected to the power reception coil 430 when load is not connected. Also, real(A) in Expressions 1, 3, and 4 is a function for returning the real component of A.

Note that, in Expressions 3 and 4, though the ratio of the real component is obtained, the ratio of the imaginary component or the ratio of an absolute value may be obtained instead of the ratio of the real component.

Also, though the electrical property acquisition unit 463 obtains the resistance $R_2$ as the impedance of the power reception coil 430, the electrical property acquisition unit 463 may obtain the reactance of the power reception coil 430 instead of the resistance.

Moreover, the electrical property acquisition unit 463 may employ a value Q of the power reception coil 430 calculated using the following expression as a parameter for detecting a foreign object, instead of impedance. Similarly, a parameter in which the parameters indicated in Expressions 1 to 4 are at least partially employed may be employed as the parameter for detecting a foreign object.

$$R_2 = \frac{1}{Q_2}\sqrt{\frac{L_2}{C_2}} \approx 2\pi \frac{f_2 L_2}{Q_2} \quad \text{Expression 5}$$

In the above expression, $Q_2$ denotes the value Q of the power reception coil 430, and $L_2$ denotes the inductance of the power reception coil 430. The unit of inductance is Henry (H), for example. Also, $C_2$ denotes the capacitance of the capacitor 440 connected to the power reception coil 430. The unit of capacitance is Farad (F), for example.

Also, the electrical property acquisition unit 463 may obtain the value Q of the detection coil 410 instead of the impedance as the parameter using the following expression. In this case, the measurement unit 451 further measures voltage $V_3'$ on the detection coil 410 side of both ends of the capacitor 420.

$$Q_3 = \frac{V_3' - V_3}{V_3} \approx \frac{V_3'}{V_3} \quad \text{Expression 6}$$

In the above expression, $Q_3$ denotes the value Q of the detection coil 410. The foreign object detecting unit 460 may employ this $Q_3$ as the parameter for detecting a foreign object.

Also, the electrical property acquisition unit 463 may obtain the value of the impedance of the detection coil 410 instead of the impedance of the power reception coil 430 as the parameter using the following expression.

$$R_3 = \frac{1}{Q_3}\sqrt{\frac{L_3}{C_3}} \approx 2\pi \frac{f_3 L_3}{Q_3} \quad \text{Expression 7}$$

In the above expression, $L_3$ denotes the inductance of the detection coil 410. The unit of inductance is Henry (H), for example. Also, $C_3$ denotes the capacitance of the capacitor 420 connected to the detection coil 410. The unit of capacitance is Farad (F). Note that the foreign object detecting unit 460 may employ the reciprocal of the impedance or the like exemplified in Expressions 1 to 7 as the parameter for detecting a foreign object.

The comparison unit 464 compares the parameter that the electrical property acquisition unit 463 with a predetermined threshold value, and supplies the comparison result thereof to the power reception control circuit 453 as the detection result. For example, the comparison unit 464 detects a foreign object in the case that the resistance $R_2$ is higher than a predetermined threshold value. Here, with the resistance $R_2$ obtained in the case that there is no foreign object as a reference value, a higher value than the reference value thereof is set as the threshold value.

Thus, in order to detect a foreign object using the detection coil voltage $V_3$, it is desirable to perform amplification of the AC signal at the measurement unit 451 as described above, since voltage has to be obtained with high precision. However, in the case of amplifying the AC signal, the gain design of the amplifying circuit is important. However, when converting the power reception control circuit 453 and so forth within the power reception device 400 including this amplifying circuit into an integrated circuit (IC), a settable gain range is restricted according to the specifications of the circuits. Accordingly, the detection coil 410 has to be designed under the constraint thereof. Therefore, as exemplified in FIGS. 4A and 4B, the detection coil 410 partially includes a partial coil capable of reducing the detection coil voltage $V_3$, so the flexibility of a gain design is higher than that in the case that the number of partial coils is only one. Also, according to this height of the flexibility, a measured value can be acquired with high precision using a suitable gain, whereby a foreign object can be detected with high precision.

Note that, though the foreign object detecting unit 460 acquires the measured value of each of the power supply amount when load is connected, and the power supply amount when load is not connected, the present technology is not restricted to this configuration. For example, an arrangement may be made wherein two different power supply amounts are sequentially supplied to the power reception device 400 while load is connected or while load is not connected, and the foreign object detecting unit 460 sequentially acquire the measured value at the corresponding power supply amount. In this case, though the power reception device 400 does not have to have the load connection circuit 457 in measurement, it is desirable from the view of operational side and safety to provide the load connection circuit 457 to the power reception device 400.

Operation Example of Power Supply Device

Figure 7:
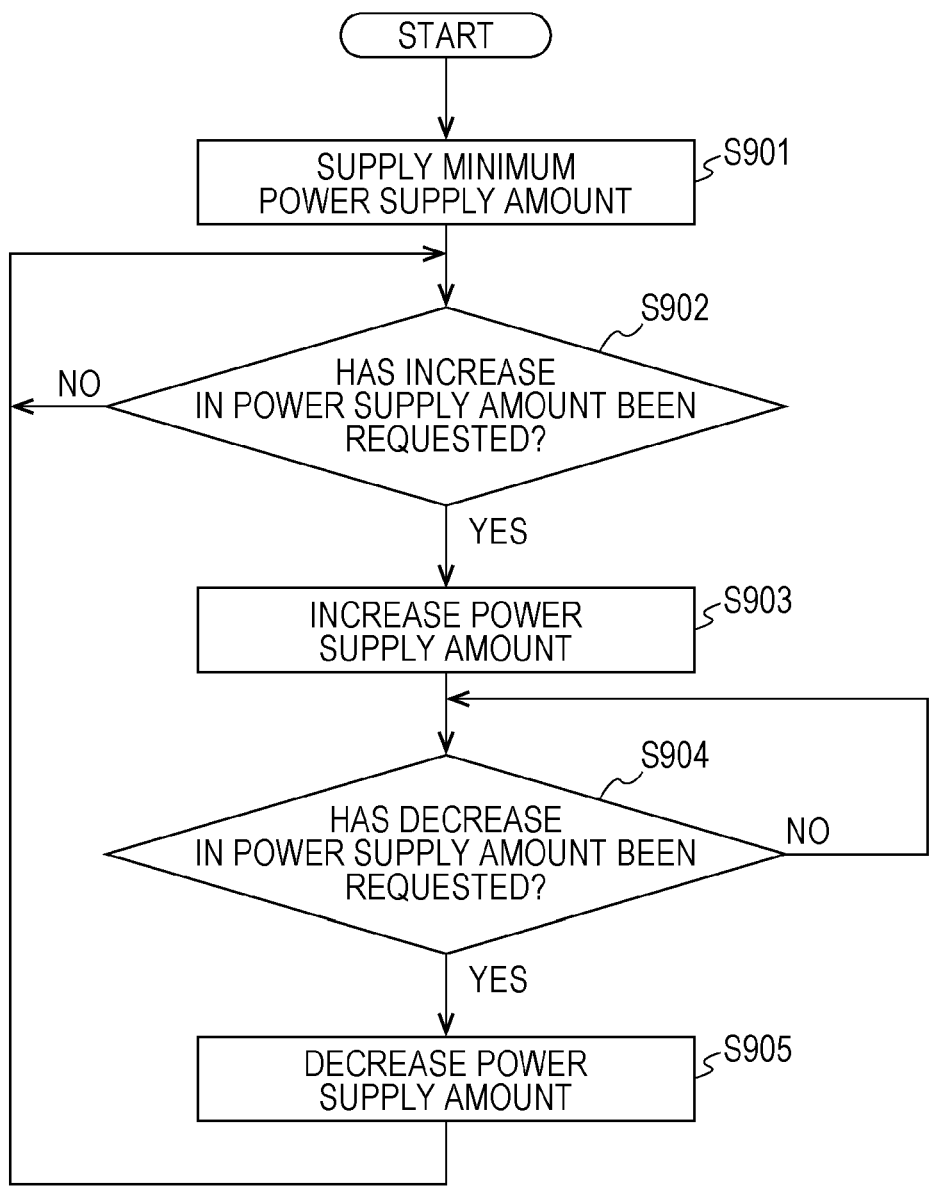
FIG. 7 is a flowchart illustrating an example of operation of the power supply device according to the first embodiment.

FIG. 7 is a flowchart illustrating an example of the operation of the power supply device 100 according to the first embodiment. This operation is started when external power is supplied to the power supply device 100, for example. The power supply device 100 supplies the minimum power supply amount W1 via the magnetic field (step S901).

Next, the power supply device 100 determines whether or not increase in the power supply amount has been requested by the power supply control signal (step S902). In the case that increase in the power supply amount has not been requested (No in step S902), the power supply device 100 returns to step S902.

In the case that increase in the power supply amount has been requested (Yes in step S902), the power supply device 100 increases the power supply amount to W2 (step S903). Next, the power supply device 100 determines whether or not decrease in the power supply amount has been requested by the power supply control signal (step S904). In the case that decrease in the power supply amount has not been requested (No in step S904), the power supply device 100 returns to step S904.

In the case that decrease in the power supply amount has been requested (Yes in step S904), the power supply device 100 decreases the power supply amount to W1 (step S905), and returns to step S902.

Operation Example of Power Reception Device

Figure 8:
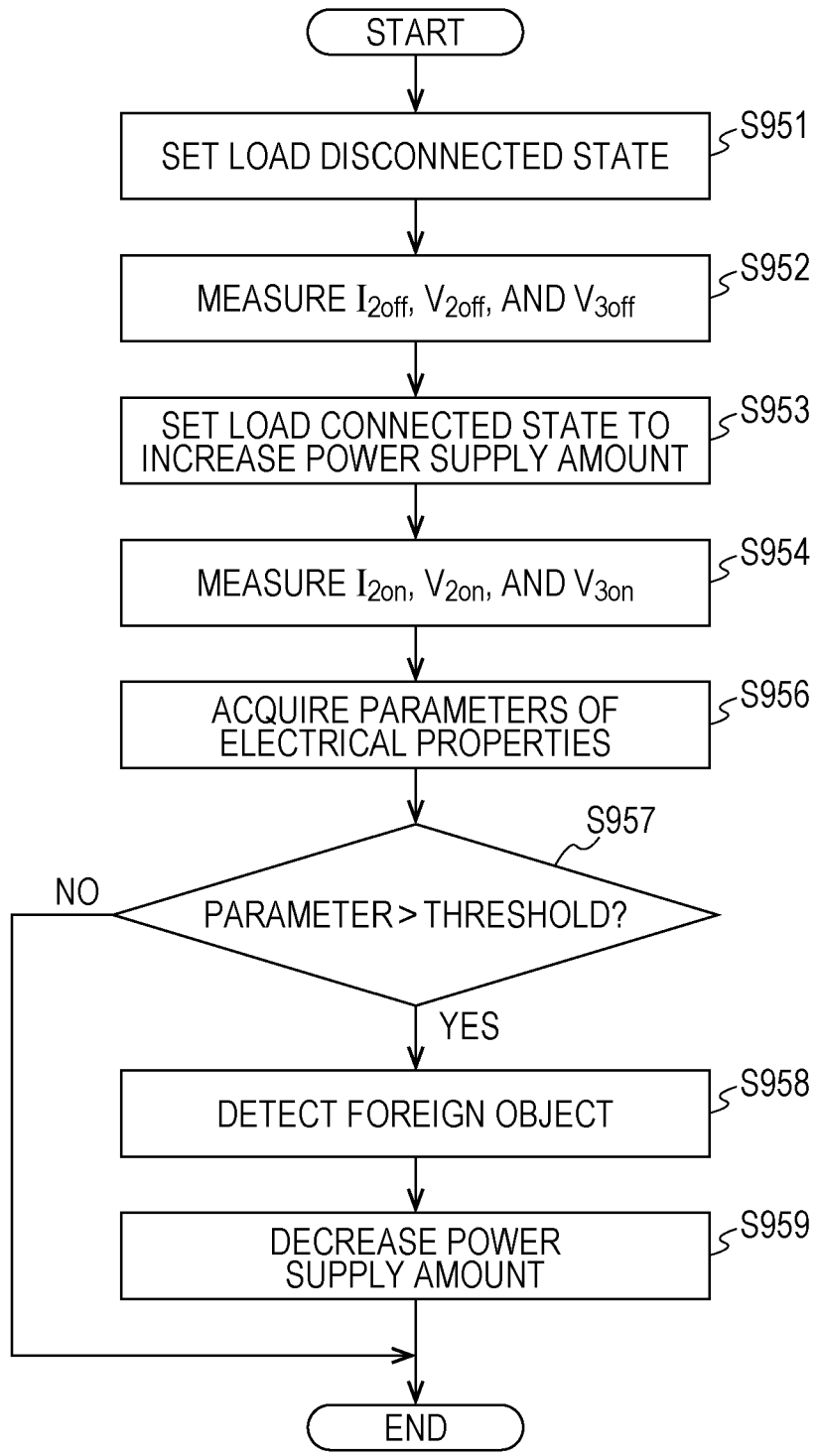
FIG. 8 is a flowchart illustrating an example of operation of the power reception device according to the first embodiment.

FIG. 8 is a flowchart illustrating an example of the operation of the power reception device 400 according to the first embodiment. This operation is started when the power is supplied from the power supply device 100, for example. The power reception device 400 makes the transition to a state in which load is not connected, in accordance with the connection control signal (step S951). The power reception device 400 measures the power reception coil current $I_{2off}$, power reception coil voltage $V_{2off}$, and detection coil voltage $V_{3off}$ (step S952).

Next, the power reception device 400 makes the transition to a state in which load is connected, in accordance with the connection control signal, and increases the power supply amount in accordance with the power supply control signal (step S953). The power reception device 400 measures the power reception coil current $I_{2on}$, power reception coil voltage $V_{2on}$, and detection coil voltage $V_{3on}$ (step S954). The power reception device 400 acquires a parameter of the electrical properties from the measured values using Expression 1 and so forth (step S956). The power reception device 400 determines whether or not the parameter thereof is higher than a threshold value (step S957).

In the case that the parameter is higher than a threshold value (Yes in step S957), the power reception device 400 detects a foreign object (step S958). Next, the power reception device 400 decreases the power supply amount in accordance with the power supply control signal (step S959). In the case that the parameter is equal to or lower than a threshold value (No in step S957), or after step S959, the power reception device 400 ends the operation for detecting a foreign object.

Note that, though the power reception device 400 detects a foreign object in the case that the parameter is higher than a threshold value, the present technology is not restricted to this configuration. For example, in the case of employing the reciprocal of the impedance or the like indicated in Expressions 1 to 4 and Expression 7 as the parameter, the power reception device 400 detects a foreign object in the case that the parameter thereof is lower than a threshold value. Also, in the case of employing the value Q exemplified in Expressions 5 and 6 as the parameter as well, the power reception device 400 detects a foreign object in the case that the parameter is lower than a threshold value.

Also, though the power reception device 400 is configured to execute the detection processing exemplified in FIG. 8 only once at the time of reception of power, the power reception device 400 may periodically execute this detection processing.

Figure 9:
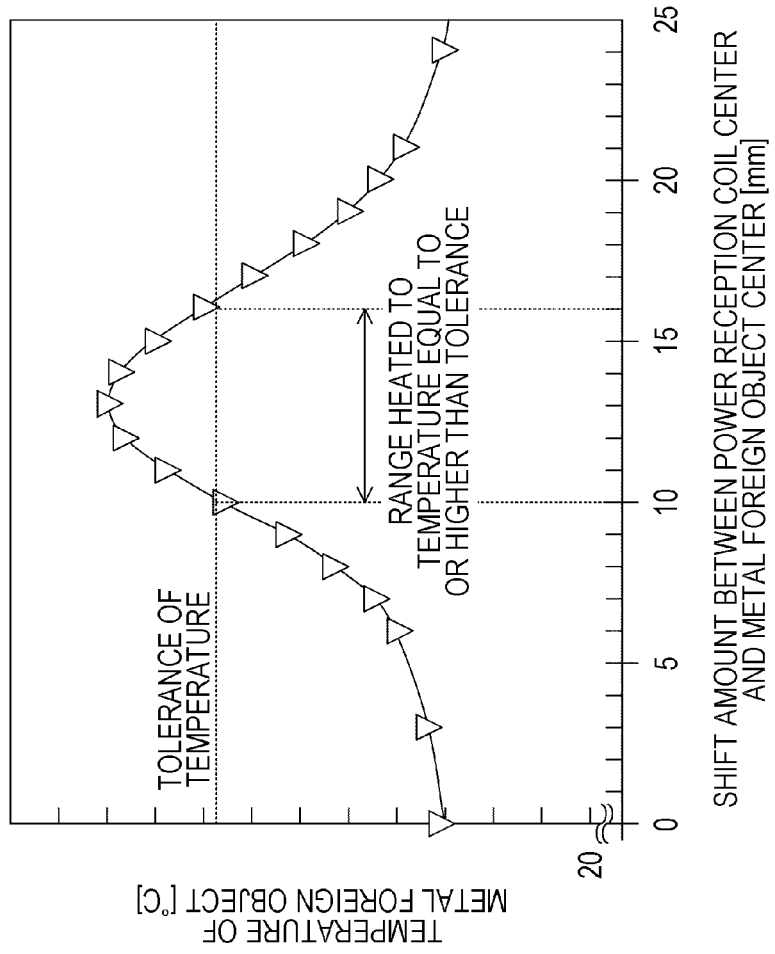
FIG. 9 is a graph illustrating an example of temperature change of a foreign object according to the first embodiment.

FIG. 9 is a graph illustrating an example of temperature change in a foreign object in the first embodiment. In FIG. 9, the vertical axis denotes the temperature of a metal foreign object heated by the magnetic field line from the power supply device 100, and the horizontal axis denotes shift amount between the center of the foreign object thereof and the center of the power reception coil 430. The unit of temperature is ° C., and the unit of shift amount is millimeter (mm), for example. Let us say that the winding wire of the power reception coil 430 is disposed in a position of around 13 mm from the center of the power reception coil 430. The greater the shift amount increases, the higher the temperature of the foreign object increases, which is the highest at around 13 mm. Also, the greater the shift amount increases exceeding 13 mm, the lower the temperature of the foreign object decreases. Therefore, it is understood that when there is a foreign object in the vicinity of a portion (track) where the winding wire of the power reception coil 430 is wound, the temperature of the foreign object particularly becomes high. Accordingly, necessity to detect a foreign object is particularly high in the vicinity of this track. Therefore, for example, the permissible value of the temperature in which the power reception device 400 is not damaged is determined beforehand. Next, a range in which the foreign object generates heat at the temperature thereof or higher (10 to 16 mm, etc.) is taken as a range in which a foreign object has to be detected. The design of the power reception device 400 is performed so as to detect a foreign object in the detection range thereof.

Figure 10:
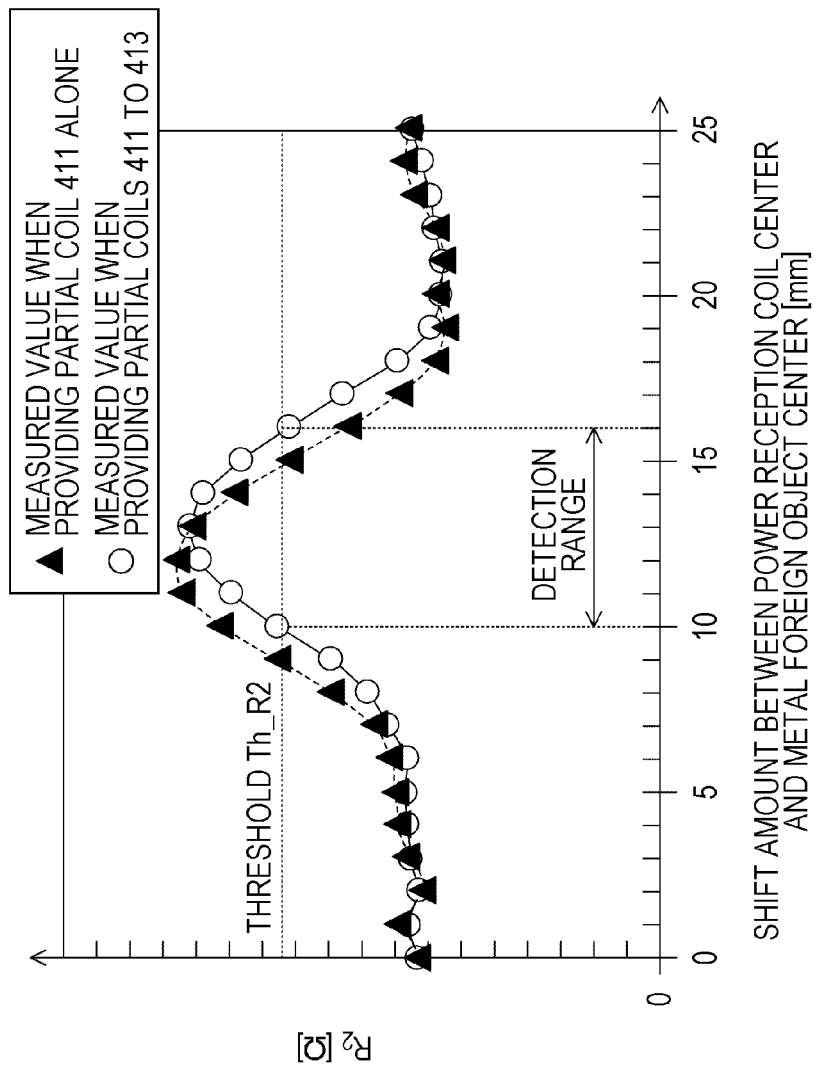
FIG. 10 is a graph illustrating an example of change in the impedance of the power reception coil according to the first embodiment.

FIG. 10 is a graph illustrating an example of change in the impedance of the power reception coil 430 according to the first embodiment. In FIG. 10, the vertical axis denotes the impedance of the power reception coil 430, and the horizontal axis denotes shift amount between the center of a foreign object, and the center of the power reception coil 430. In FIG. 10, let us say that measurement conditions such as the dimensions and material of a foreign object, power supply amount, and so forth are the same as those in FIG. 9.

White circles in FIG. 10 are plotted measured values of the impedance in the case that the detection coil 410 includes the partial coils 411 to 413. Black triangles are plotted measured values of the impedance in the case that the detection coil 410 includes the partial coil 411 alone. As illustrated in FIG. 10, in the case that the detection coil 410 includes the partial coil 411 alone, a position where the peak of the impedance appears is shifted from around 13 mm where the peak of the temperature of the foreign object appears. On the other hand, in the case that the detection coil 410 includes the partial coils 411 to 413, a position where the peak of the impedance appears generally agrees with a position where the peak of the temperature of the foreign object appears. Therefore, according to a threshold value Th_R2 being set to a suitable value, the power reception device 400 can accurately detect a foreign object in a range in which the foreign object generates heat at temperature equal to or higher than the permissible value (around 13 mm or the like).

Figure 11:
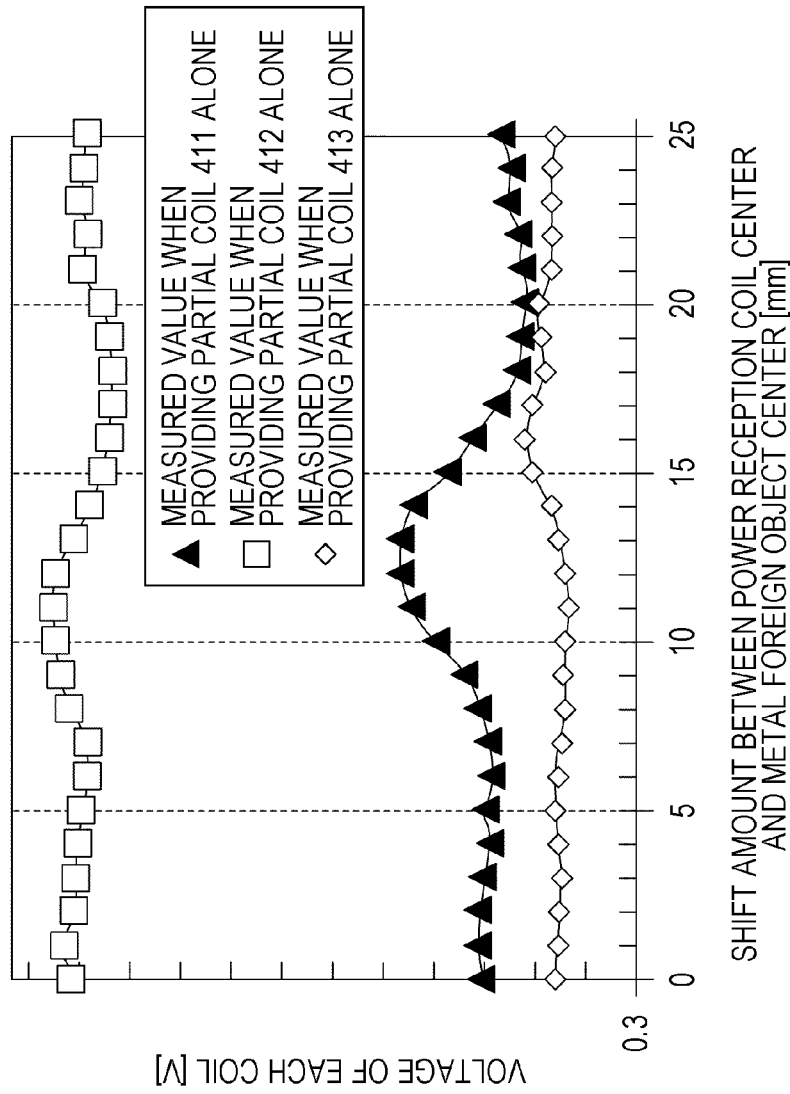
FIG. 11 is a graph illustrating an example of change of the voltage of each of partial coils according to the first embodiment.

FIG. 11 is a graph illustrating an example of change in voltage of each of the partial coils 411, 412, and 413 according to the first embodiment. In FIG. 11, the vertical axis denotes the voltage of the detection coil 410 including only one of the partial coils 411, 412, and 413. The horizontal axis denotes shift amount between the center of a foreign object and the center of the power reception coil 430.

Figure 12:
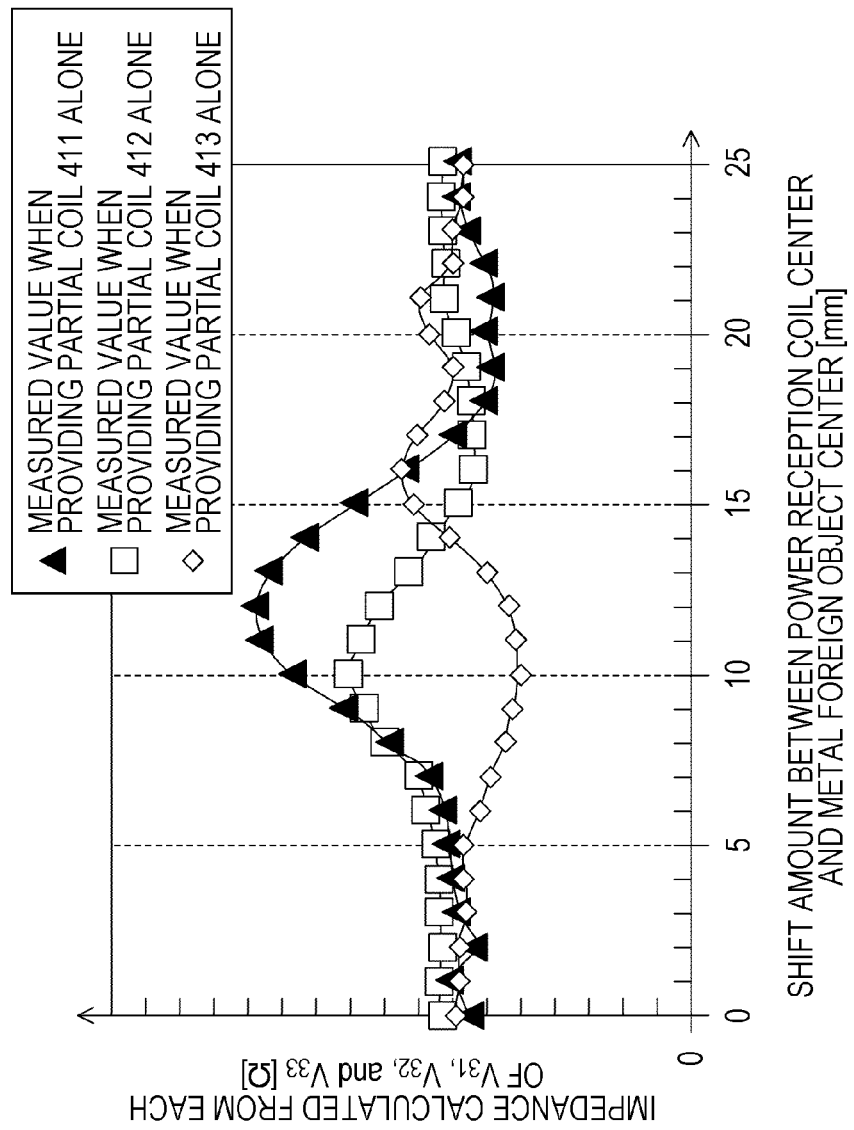
FIG. 12 is a graph illustrating an example of change in impedance measured by the partial coils according to the first embodiment.

FIG. 12 is a graph illustrating an example of change in impedance measured by the partial coils 411, 412, and 413 according to the first embodiment. In FIG. 12, the vertical axis denotes the impedance of the power reception coil 430 measured by the detection coil 410 including only one of the partial coils 411, 412, and 413. The horizontal axis denotes shift amount between the center of a foreign object and the center of the power reception coil 430.

Let us say that measurement conditions in FIGS. 11 and 12 such as the dimensions and material of a foreign object, power supply amount, and so forth are the same as those in FIG. 9. Also, black triangles in FIGS. 11 and 12 are plotted measured values of the voltage in the case that the detection coil 410 includes the partial coil 411 alone. Squares are plotted measured values of the voltage in the case that the detection coil 410 includes the partial coil 412 alone. Lozenges are plotted measured values of the voltage in the case that the detection coil 410 includes the partial coil 413 alone.

It is understood from the measurement results in FIGS. 11 and 12 that a portion (hereinafter, referred to as notch portion) where the voltage or impedance fluctuates due to the dimensions (coil area and so forth) of the partial coil differs. Also, it is also understood that the greater the dimensions of the partial coil are, the notch portion occurs in a position where the shift amount between the center of the power reception coil 430 and the center of the metal foreign object is great. For example, in the case that a metal foreign object does not exist in the vicinity of an electrical lead portion making up the power reception coil 430, but exists in the vicinity of an electrical lead portion making up the detection coil 410, voltage generated at the detection coil 410 decreases.

On the other hand, in the case that a metal foreign object does not exist in the vicinity of an electrical lead portion of the detection coil 410, but exists in the vicinity of an electrical lead portion of the power reception coil 430, the transmission efficiency of the noncontact power supply system deteriorates due to existence of the metal foreign object. Therefore, the number of magnetic field lines generated from the power supply coil 160 relatively increases, and the voltage of the detection coil 410 increases.

Also, there may be a case where a metal foreign object exists in the vicinity of an electrical lead portion making up the power reception coil 430, and also exists in the vicinity of an electrical lead portion making up the detection coil 410. In this case, increase/decrease in the voltage of the detection coil 410 depends on the influence level of the metal foreign object as to each of the power supply coil 160, power reception coil 430, and detection coil 410.

As described above, in the case of employing only one partial coil, unnecessary change (notch portion) occurs on the parameters such as the impedance and so forth at the disposed position thereof, since there is a foreign object disposed position where the voltage generated at the detection coil 410 is decreased due to the metal foreign object. A position where the detection precision of a foreign object is the highest, and a position where a metal foreign object has the highest temperature are shifted due to influence of the unnecessary change in the parameters. Also, there may be a case where the range of the detectable disposed position of a metal foreign object is narrowed due to the unnecessary change in the parameters.

Note that, in the case of employing only one of the partial coils 411, 412, and 413 in FIGS. 11 and 12, it is also understood that the more the radius of the partial coil thereof, and distance from the center of the power supply coil 430 to the track center portion differs, the more the detection precision of a foreign object improves.

Specifically, it is desirable that the innermost portion of the partial coil 411 of which the radius is the greatest is positioned outside the track center portion of the power reception coil 430 (the middle of the outermost edge and innermost edge of the power reception coil). Also, it is desirable that the outermost portion of the partial coil 411 is positioned inside the track center portion of the power reception coil 430.

Also, it is desirable that the innermost portion of the partial coil 411 of which the radius is the greatest is positioned outside the outermost portion of the power reception coil 430. Moreover, it is further desirable that the outermost portion of the partial coil 411 is positioned inside the innermost portion of the power reception coil 430. Note that, in this case, the detection coil 410 and power reception coil 430 can be configured generally on the same flat surface.

Thus, according to the first embodiment of the present technology, the partial coil 412 is disposed between the partial coils 411 and 413, to which current in a direction different from those is induced, whereby the detection precision of a foreign object can be improved suppressing cancellation of the magnetic fields between those coils.

2. Second Embodiment

Though the power reception device 400 according to the first embodiment detects a foreign object from the impedance of the power reception coil 430, a foreign object may be detected from ΔK. A power reception device 400 according to the second embodiment differs from that in the first embodiment in that a foreign object is detected from the ΔK.

A measurement unit 451 according to the second embodiment does not measure the power reception coil current $I_2$. Therefore, the ammeter or the like may be omitted from the measurement unit 451.

Also, a foreign object detecting unit 460 according to the second embodiment obtains ΔK using Expressions 2 to 4, and detects a foreign object by comparing the ΔK and a threshold value.

Figure 13:
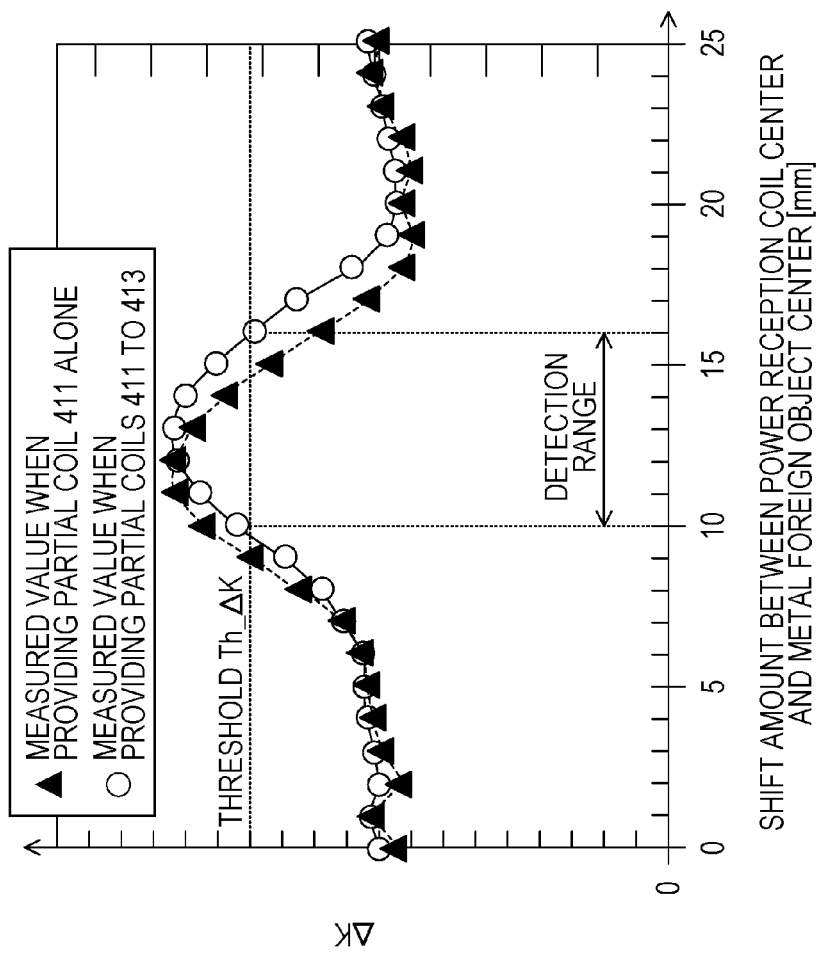
FIG. 13 is a graph illustrating an example of change in ΔK according to a second embodiment.

FIG. 13 is a graph illustrating an example of change in the ΔK in the second embodiment. In FIG. 13, the vertical axis denotes the ΔK, and the horizontal axis denotes shift amount between the center of a foreign object and the center of the power reception coil 430. In FIG. 13, let us say that measurement conditions such as the dimensions and material of a foreign object, power supply amount, and so forth are the same as those in FIG. 9.

White circles in FIG. 13 are plotted measured values of the ΔK in the case that the detection coil 410 includes the partial coils 411 to 413. Black triangles are plotted measured values of the ΔK in the case that the detection coil 410 includes the partial coil 411 alone. As illustrated in FIG. 13, in the case that the detection coil 410 includes the partial coil 411 alone, a position where the peak of the ΔK appears is shifted from around 13 mm where the peak of the temperature of the foreign object appears. On the other hand, in the case that the detection coil 410 includes the partial coils 411 to 413, a position where the peak of the ΔK appears generally agrees with a position where the peak of the temperature of the foreign object appears. Therefore, according to a threshold value Th_ΔK being set to a suitable value, the power reception device 400 can accurately detect a foreign object in a range in which the foreign object generates heat at temperature equal to or higher than the permissible value (around 13 mm or the like).

As described above, according to the second embodiment, a foreign object can accurately be detected based on the ΔK.

3. Third Embodiment

Though the power reception device 400 according to the first embodiment detects a foreign object from the impedance of the power reception coil 430, a foreign object may be detected from a voltage ratio between the power reception coil 430 and detection coil 410. A power reception device 400 according to the third embodiment differs from that in the first embodiment in that a foreign object is detected from the voltage ratio.

A measurement unit 451 according to the third embodiment does not measure the power reception coil current $I_2$. Therefore, an ammeter or the like may be omitted from the measurement unit 451. Also, the measurement unit 451 does not measure the power reception coil voltage $V_{2off}$ and detection coil voltage $V_{3off}$ when load is not connected. Since these do not have to be measured, latency from measurement start of measured values to detection completion of a foreign object is shortened.

Also, a foreign object detecting unit 460 according to the third embodiment obtains the voltage ratio using Expression 4, and detects a foreign object by comparing the voltage ratio and a threshold value. Note that an arrangement may be made wherein instead of the power reception coil voltage $V_{2on}$ and detection coil voltage $V_{3on}$ when load is connected, the power reception coil voltage $V_{2off}$ and detection coil voltage $V_{3off}$ when load is not connected are measured, and a foreign object is detected from the voltage ratio obtained by Expression 3. Further, though the voltage ratio of the real component is utilized in Expressions 3 and 4, a foreign object may be detected from the voltage ratio of the imaginary component and the voltage ratio of the absolute value.

Figure 14:
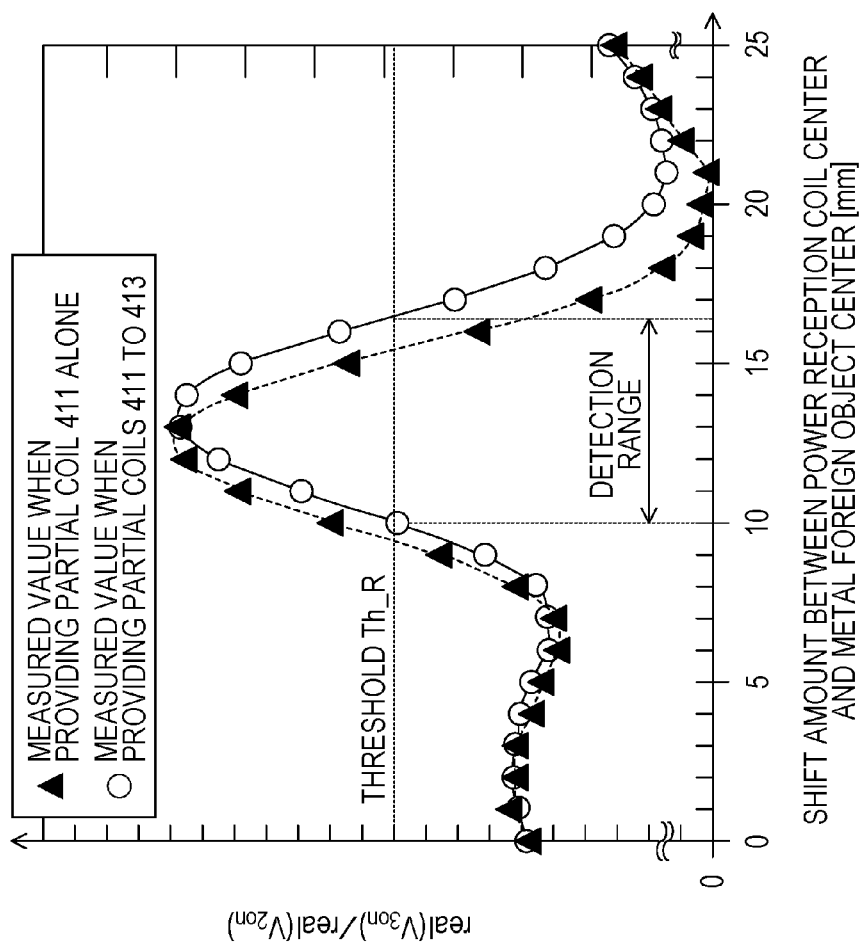
FIG. 14 is a graph illustrating an example of change in a voltage ratio according to a third embodiment.

FIG. 14 is a graph illustrating an example of change in the voltage ratio in the third embodiment. In FIG. 14, the vertical axis denotes the voltage ratio obtained from Expression 4, and the horizontal axis denotes shift amount between the center of a foreign object and the center of the power reception coil 430. In FIG. 14, let us say that measurement conditions such as the dimensions and material of a foreign object, power supply amount, and so forth are the same as those in FIG. 9.

White circles in FIG. 14 are plotted measured values of the voltage ratio in the case that the detection coil 410 includes the partial coils 411 to 413. Black triangles are plotted measured values of the voltage ratio in the case that the detection coil 410 includes the partial coil 411 alone. As illustrated in FIG. 14, in the case that the detection coil 410 includes the partial coil 411 alone, a position where the peak of the voltage ratio appears is shifted from around 13 mm where the peak of the temperature of the foreign object appears. On the other hand, in the case that the detection coil 410 includes the partial coils 411 to 413, a position where the peak of the voltage ratio appears generally agrees with a position where the peak of the temperature of the foreign object appears. Therefore, according to a threshold value Th_R being set to a suitable value, the power reception device 400 can accurately detect a foreign object in a range in which the foreign object generates heat at temperature equal to or higher than the permissible value (around 13 mm or the like).

As described above, according to the third embodiment, a foreign object can accurately be detected based on the voltage ratio.

4. Fourth Embodiment

Though the power reception device 400 according to the first embodiment detects a foreign object from the impedance of the power reception coil 430, a foreign object may be detected from the detection coil voltage. A power reception device 400 according to the fourth embodiment differs from that in the first embodiment in that a foreign object is detected from the detection coil voltage $V_{3on}$.

A measurement unit 451 according to the fourth embodiment measures the detection coil voltage $V_{3on}$, alone. Also, the power reception coil voltage and current do not have to be measured, which simplifies the configuration of the measurement unit 451.

Also, a foreign object detecting unit 460 according to the third embodiment detects a foreign object by comparing the real component of the detection coil voltage $V_{3on}$, and a threshold value.

Note that, though the foreign object detecting unit 460 detects a foreign object from the real component of the detection coil voltage $V_{3on}$, the present technology is not restricted to this configuration. For example, the foreign object detecting unit 460 may detect a foreign object from the imaginary component of the detection coil voltage $V_{3on}$ and the absolute value of the detection coil voltage $V_{3on}$. Alternatively, the foreign object detecting unit 460 may measure the detection coil voltage $V_{3off}$ when load is not connected instead of the detection coil voltage $V_{3on}$ when load is connected, and detect a foreign object from this detection coil voltage $V_{3off}$.

Figure 15:
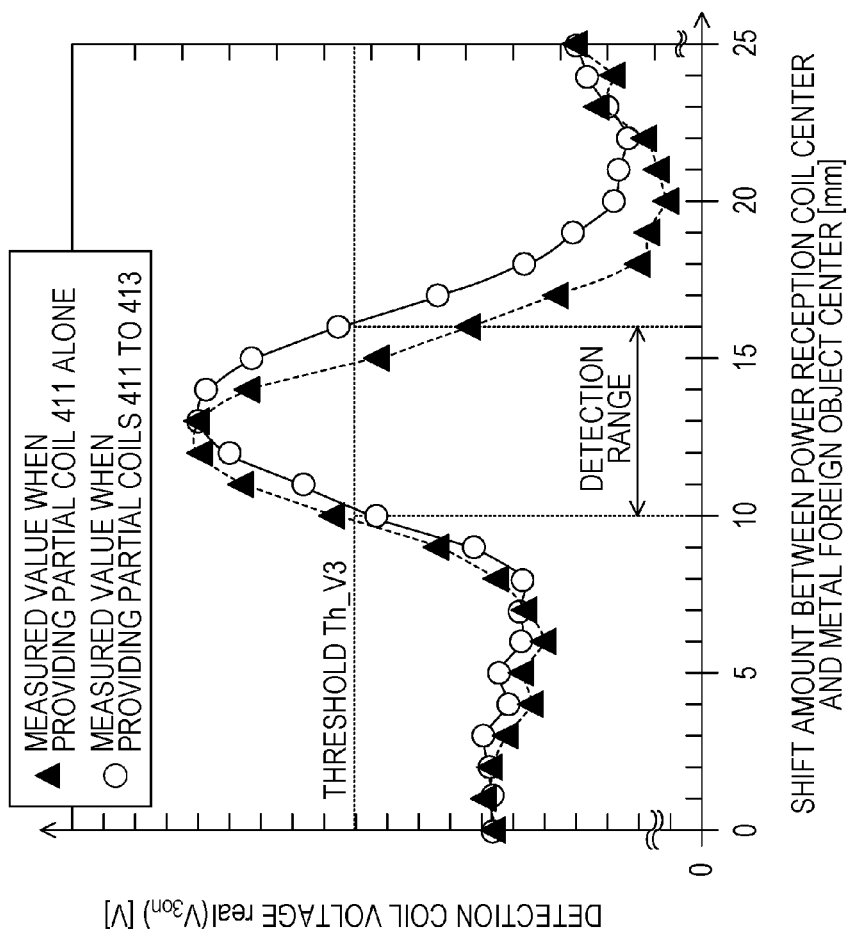
FIG. 15 is a graph illustrating an example of change in the voltage of a detection coil according to a fourth embodiment.

FIG. 15 is a graph illustrating an example of change in the detection coil voltage $V_{3on}$ in the fourth embodiment. In FIG. 15, the vertical axis denotes the real component of the detection coil voltage $V_{3on}$, and the horizontal axis denotes shift amount between the center of a foreign object and the center of the power reception coil 430. In FIG. 15, let us say that measurement conditions such as the dimensions and material of a foreign object, power supply amount, and so forth are the same as those in FIG. 9.

White circles in FIG. 15 are plotted measured values of the detection coil voltage $V_{3on}$ in the case that the detection coil 410 includes the partial coils 411 to 413. Black triangles are plotted measured values of the detection coil voltage $V_{3on}$ in the case that the detection coil 410 includes the partial coil 411 alone. As illustrated in FIG. 15, in the case that the detection coil 410 includes the partial coil 411 alone, a position where the peak of the detection coil voltage $V_{3on}$ appears is shifted from around 13 mm where the peak of the temperature of the foreign object appears. On the other hand, in the case that the detection coil 410 includes the partial coils 411 to 413, a position where the peak of the detection coil voltage $V_{3on}$ appears generally agrees with a position where the peak of the temperature of the foreign object appears. Therefore, according to a threshold value Th_V3 being set to a suitable value, the power reception device 400 can accurately detect a foreign object in a range in which the foreign object generates heat at temperature equal to or higher than the permissible value (around 13 mm or the like).

As described above, according to the fourth embodiment, a foreign object can accurately be detected based on the detection coil voltage.

5. Modifications

Though the detection coil 410 is disposed in the layout exemplified in FIGS. 4A and 4B in the first embodiment, the detection coil 410 may be disposed in a layout different from that in FIGS. 4A and 4B. A power reception device 400 according to a modification differs from that in the first embodiment in that the layout of the detection coil 410 differs from that in FIGS. 4A and 4B.

FIGS. 16A to 16I are cross-sectional views illustrating a first example of the layout of the power reception coil and detection coil according to the modification.

FIG. 16A is an example in which the partial coil 411 is disposed between outside the track center of the power reception coil 430 and the outermost edge of the power reception coil 430, and the partial coils 412 and 413 are disposed inside the innermost edge of the power reception coil 430.

FIG. 16B is an example in which the partial coil 411 is disposed outside the power reception coil 430, and the partial coil 412 is disposed on the track of the power reception coil 430, and the partial coil 413 is disposed inside the power reception coil 430.

FIG. 16C is an example in which the partial coil 411 is disposed outside the power reception coil 430, and the partial coil 412 is disposed on the track of the power reception coil 430, the partial coil 413 is disposed inside the power reception coil 430, and the disposed surfaces of the partial coils differ.

FIG. 16D is an example in which the number of windings of all of the partial coils is increased in FIG. 16B. FIG. 16E is an example in which the number of windings of the partial coils 411 and 413 alone is increased, and a portion of the partial coil 413 is disposed on the track of the power reception coil 430 in FIG. 16B.

FIG. 16F is an example in which the gap between the winding wires of the partial coils 411 and 413 is increased in FIG. 16D.

FIG. 16G is an example in which the partial coils 412 and 413 are disposed in a position sandwiching the center on the track of the power reception coil 430, and a partial coil 414 is added to the inside of the partial coil 413. The partial coil 414 is connected to the partial coil 413.

FIG. 16H is an example in which partial coils 414 and 415 are added to the inside of the partial coil 413, and the partial coils 413 and 414 are disposed in a position sandwiching the center on the track of the power reception coil 430. The partial coil 415 is connected to the partial coil 414.

FIG. 16I is an example in which partial coils 414, 415, and 416 are added to the inside of the partial coil 413, and the partial coils 413 and 414 are disposed in a position sandwiching the center on the track of the power reception coil 430. The partial coil 416 is connected to the partial coil 415.

FIGS. 17A to 17F are cross-sectional views illustrating a second example of the layout of the power reception coil and detection coil according to the modification.

Figure 17A:
Figure 17B:
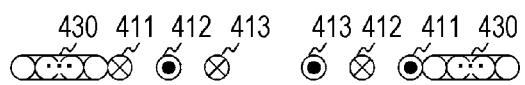

FIG. 17A is an example in which the detection coil 410 is disposed outside the power reception coil 430. FIG. 17B is an example in which the detection coil 410 is disposed inside the power reception coil 430.

Figure 17C:
Figure 17D:
Figure 17E:
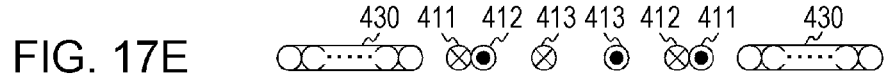

FIG. 17C is an example in which partial coils 414, 415, and 416 are added to the inside of the partial coil 413, the partial coils 411 to 413 are disposed outside the power reception coil 430, and the partial coils 414 to 416 are disposed inside the power reception coil 430. FIG. 17D is an example in which the winding methods of the partial coils are inverted in FIG. 17C. FIG. 17E is an example in which the partial coil 416 on the outermost side is disposed away from the innermost edge of the power reception coil 430 in FIG. 17B. FIG. 17F is an example in which the partial coil 414 employing the opposite winding method of the winding method of the partial coil 413 is further disposed inside the partial coil 413 in FIG. 17E.

According to the partial coils being disposed as exemplified in FIGS. 17A to 17F, the detection coil 410 and power reception coil 430 can be disposed generally on the same flat surface, which facilitates reduction in the thickness of the power reception device 400.

Note that the above embodiments are exemplary for realizing the present technology, and that matter in the embodiments and the disclosure-specifying matter in the Claims have correlation. Similarly, the disclosure-specifying matter in the Claims, and the matter in the embodiments of the present technology designated by the same nomenclature have correlation. However, the present technology is not restricted to the embodiments, and may be carried out by variously modifying the embodiments without departing from the essence thereof.

Also, the processing procedures described in the above embodiments may be taken as a method including these series of procedures, or may be taken as a program causing a computer to execute these series of procedures, through a recording medium configured to store the program thereof. Examples of this recording medium include CD (Compact Disc), MD (MiniDisc), DVD (Digital Versatile Disc), memory card, and Blu-ray (registered trademark) Disc.

Note that the present technology may also have the following configurations.

(1) A detecting device including: a measurement coil made up of a first partial coil to which current in a particular direction is induced by a magnetic field to be supplied to a power reception coil configured to receive power, a second partial coil to which the current in the particular direction is induced by the magnetic field, and a third partial coil, which is disposed between the first and second partial coils, to which current in the opposite direction of the particular direction is induced by the magnetic field; a measurement unit configured to measure the voltage of the measurement coil as measurement coil voltage; and a foreign object detecting unit configured to detect a foreign object within the magnetic field based on the measurement coil voltage.

(2) The detecting device according to (1), wherein the measurement unit further measures the voltage and current of the power reception coil; and wherein the foreign object detecting unit acquires impedance of the power reception coil from the measurement coil voltage and the voltage and current of the power reception coil, and detects the foreign object based on such impedance.

(3) The detecting device according to (1) or (2), wherein the measurement unit further measures the voltage of the power reception coil as power reception coil voltage; and wherein the foreign object detecting unit acquires a voltage ratio between the measurement coil voltage and the power reception coil voltage, and detects the foreign object based on this voltage ratio.

(4) The detecting device according (3), wherein the power reception coil receives first and second power which differs in electric energy in this order; and wherein the foreign object detecting unit detects the foreign object based on difference between the voltage ratio acquired in the case of the first power having been received, and the voltage ratio acquired in the case of the second power having been received.

(5) The detecting device according to any one of (1) to (4), wherein the first partial coil, the second partial coil, and the third partial coil are serially connected.

(6) The detecting device according to any one of (1) to (5), wherein the area of each coil surface of the first partial coil, the second partial coil, and the third partial coil differs.

(7) The detecting device according to (6), wherein two coils of the first partial coil, the second partial coil, and the third partial coil are disposed in a position sandwiching the middle of the outermost edge and the innermost edge of the power reception coil.

(8) The detecting device according to (7), wherein at least one of the first partial coil, the second partial coil, and the third partial coil is disposed outside the outermost edge of the power reception coil.

(9) The detecting device according to (7) or (8), wherein at least one of the first partial coil, the second partial coil, and the third partial coil is disposed inside the innermost edge of the power reception coil.

(10) The detecting device according to any one of (1) to (9), wherein the first partial coil, the second partial coil, and the third partial coil are disposed generally on the same flat surface.

(11) The detecting device according to any one of (1) to (10), wherein the first partial coil, the second partial coil, and the third partial coil are disposed in a position where the centers of the coil surfaces thereof generally agree.

(12) The detecting device according to any one of (1) to (11), further including: a power supply device configured to supply the power; and a transmission unit configured to transmit a control signal for requesting reduction of electric energy of the power in the case of the foreign object having been detected to the power supply device.

(13) A detecting device including: a measurement coil made up of a first partial coil to which current in a particular direction is induced by a magnetic field that a power supply coil configured to supply power supplies to a power reception coil, a second partial coil to which the current in the particular direction is induced by the magnetic field, and a third partial coil, which is disposed between the first and second partial coils, to which current in the opposite direction of the particular direction is induced by the magnetic field; a measurement unit configured to measure the voltage of the measurement coil as measurement coil voltage; and a foreign object detecting unit configured to detect a foreign object within the magnetic field based on the measurement coil voltage.

(14) A power supply system including: a power supply coil configured to supply power via a magnetic field; a power reception coil configured to receive the power; a measurement coil made up of a first partial coil to which current in a particular direction is induced by the magnetic field, a second partial coil to which the current in the particular direction is induced by the magnetic field, and a third partial coil, which is disposed between the first and second partial coils, to which current in the opposite direction of the particular direction is induced by the magnetic field; a measurement unit configured to measure the voltage of the measurement coil as measurement coil voltage; and a foreign object detecting unit configured to detect a foreign object within the magnetic field based on the measurement coil voltage.

(15) A detecting device control method including: measuring, at a measurement unit, voltage of a measurement coil made up of a first partial coil to which current in a particular direction is induced by a magnetic field to be supplied to a power reception coil configured to receive power, a second partial coil to which the current in the particular direction is induced by the magnetic field, and a third partial coil, which is disposed between the first and second partial coils, to which current in the opposite direction of the particular direction is induced by the magnetic field, as measurement coil voltage; and detecting, at a foreign object detecting unit, a foreign object within the magnetic field based on the measurement coil voltage.

It should be understood by those skilled in the art that various modifications, combinations, sub-combinations and alterations may occur depending on design requirements and other factors insofar as they are within the scope of the appended claims or the equivalents thereof.

What is claimed is:

1. A detecting device comprising:
a measurement coil made up of
a first partial coil to which current in a particular direction is induced by a magnetic field to be supplied to a power reception coil configured to receive power,
a second partial coil to which the current in the particular direction is induced by the magnetic field, and
a third partial coil, which is disposed between the first and second partial coils, to which current in the opposite direction of the particular direction is induced by the magnetic field;
a measurement unit configured to measure the voltage of the measurement coil as measurement coil voltage; and
a foreign object detecting unit configured to detect a foreign object within the magnetic field based on the measurement coil voltage,
wherein the area of each coil surface of the first partial coil, the second partial coil, and the third partial coil differs,
wherein two coils of the first partial coil, the second partial coil, and the third partial coil are disposed in a position sandwiching the middle of the outermost edge and the innermost edge of the power reception coil.

2. The detecting device according to claim 1,
wherein the measurement unit further measures the voltage and current of the power reception coil, and
wherein the foreign object detecting unit acquires impedance of the power reception coil from the measurement coil voltage and the voltage and current of the power reception coil, and detects the foreign object based on such impedance.

3. The detecting device according to claim 1,
wherein the measurement unit further measures the voltage of the power reception coil as power reception coil voltage, and
wherein the foreign object detecting unit acquires a voltage ratio between the measurement coil voltage and the power reception coil voltage, and detects the foreign object based on this voltage ratio.

4. The detecting device according to claim 3,
wherein the power reception coil receives first and second power which differs in electric energy in this order, and
wherein the foreign object detecting unit detects the foreign object based on difference between the voltage ratio acquired in the case of the first power having been received, and the voltage ratio acquired in the case of the second power having been received.

5. The detecting device according to claim 1, wherein the first partial coil, the second partial coil, and the third partial coil are serially connected.

6. The detecting device according to claim 1, wherein at least one of the first partial coil, the second partial coil, and the third partial coil is disposed outside the outermost edge of the power reception coil.

7. The detecting device according to claim 1, wherein at least one of the first partial coil, the second partial coil, and the third partial coil is disposed inside the innermost edge of the power reception coil.

8. The detecting device according to claim 1, wherein the first partial coil, the second partial coil, and the third partial coil are disposed generally on the same flat surface.

9. The detecting device according to claim 1, wherein the first partial coil, the second partial coil, and the third partial coil are disposed in a position where the centers of the coil surfaces thereof generally agree.

10. The detecting device according to claim 1, further comprising:
a power supply device configured to supply the power; and
a transmission unit configured to transmit a control signal for requesting reduction of electric energy of the power in the case of the foreign object having been detected to the power supply device.

11. A detecting device comprising:
a measurement coil made up of
a first partial coil to which current in a particular direction is induced by a magnetic field that a power supply coil configured to supply power supplies to a power reception coil,
a second partial coil to which the current in the particular direction is induced by the magnetic field, and a third partial coil, which is disposed between the first and second partial coils, to which current in the opposite direction of the particular direction is induced by the magnetic field;

a measurement unit configured to measure the voltage of the measurement coil as measurement coil voltage; and a foreign object detecting unit configured to detect a foreign object within the magnetic field based on the measurement coil voltage, wherein the area of each coil surface of the first partial coil, the second partial coil, and the third partial coil differs, wherein two coils of the first partial coil, the second partial coil, and the third partial coil are disposed in a position sandwiching the middle of the outermost edge and the innermost edge of the power reception coil.

12. A power supply system comprising:

a power supply coil configured to supply power via a magnetic field;

a power reception coil configured to receive the power;

a measurement coil made up of a first partial coil to which current in a particular direction is induced by the magnetic field, a second partial coil to which the current in the particular direction is induced by the magnetic field, and a third partial coil, which is disposed between the first and second partial coils, to which current in the opposite direction of the particular direction is induced by the magnetic field;

a measurement unit configured to measure the voltage of the measurement coil as measurement coil voltage; and a foreign object detecting unit configured to detect a foreign object within the magnetic field based on the measurement coil voltage, wherein the area of each coil surface of the first partial coil, the second partial coil, and the third partial coil differs, wherein two coils of the first partial coil, the second partial coil, and the third partial coil are disposed in a position sandwiching the middle of the outermost edge and the innermost edge of the power reception coil.

13. A detecting device control method comprising:

measuring, at a measurement unit, voltage of a measurement coil made up of a first partial coil to which current in a particular direction is induced by a magnetic field to be supplied to a power reception coil configured to receive power, a second partial coil to which the current in the particular direction is induced by the magnetic field, and a third partial coil, which is disposed between the first and second partial coils, to which current in the opposite direction of the particular direction is induced by the magnetic field, as measurement coil voltage; and detecting, at a foreign object detecting unit, a foreign object within the magnetic field based on the measurement coil voltage, wherein the area of each coil surface of the first partial coil, the second partial coil, and the third partial coil differs, wherein two coils of the first partial coil, the second partial coil, and the third partial coil are disposed in a position sandwiching the middle of the outermost edge and the innermost edge of the power reception coil.

* * * * *

UNITED STATES PATENT AND TRADEMARK OFFICE
CERTIFICATE OF CORRECTION

PATENT NO. : 9,601,271 B2
APPLICATION NO. : 14/259345
DATED : March 21, 2017
INVENTOR(S) : Uichiro Omae et al.

It is certified that error appears in the above-identified patent and that said Letters Patent is hereby corrected as shown below:

On the Title Page

At (73) Assignee:
Please replace "New York, NY (US)" with -- Tokyo (JP) --

Signed and Sealed this
Nineteenth Day of September, 2017

Joseph Matal
*Performing the Functions and Duties of the*
*Under Secretary of Commerce for Intellectual Property and*
*Director of the United States Patent and Trademark Office*